United States Patent
Xu et al.

(10) Patent No.: US 11,323,336 B2
(45) Date of Patent: May 3, 2022

(54) NETWORK SLICE MANAGEMENT METHOD AND DEVICE

(71) Applicant: HUAWEI TECHNOLOGIES CO., LTD., Shenzhen (CN)

(72) Inventors: Ruiyue Xu, Shanghai (CN); Kai Zhang, Shanghai (CN); Yan Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/829,061

(22) Filed: Mar. 25, 2020

(65) Prior Publication Data
US 2020/0287801 A1 Sep. 10, 2020

Related U.S. Application Data

(63) Continuation of application No. PCT/CN2018/106043, filed on Sep. 17, 2018.

(30) Foreign Application Priority Data

Sep. 27, 2017 (CN) .......................... 201710890324.0

(51) Int. Cl.
*H04L 12/24* (2006.01)
*H04L 41/5009* (2022.01)
*H04L 41/14* (2022.01)

(52) U.S. Cl.
CPC .......... *H04L 41/5009* (2013.01); *H04L 41/14* (2013.01)

(58) Field of Classification Search
CPC ............. H04L 41/5051; H04L 41/0893; H04L 41/5009; H04L 41/5048; H04L 41/5054; H04L 41/14; H04W 16/02
See application file for complete search history.

(56) References Cited

U.S. PATENT DOCUMENTS 10,499,446 B1 * 12/2019 Dowlatkhah ......... H04W 24/02
2016/0050120 A1    2/2016 Liu et al.
(Continued)

FOREIGN PATENT DOCUMENTS

CN      103269282 A     8/2013
CN      106060900 A    10/2016
(Continued)

OTHER PUBLICATIONS

3GPP TR 28.801 V15.0.0 (Sep. 2017), 3rd Generation Partnership Project;Technical Specification Group Services and System Aspects; Telecommunication management; Study on management and orchestration of network slicing for next generation network (Release 15), Sep. 1, 2017; 78 pages.
(Continued)

*Primary Examiner* — Shean Tokuta
(74) *Attorney, Agent, or Firm* — Rimon PC

(57) ABSTRACT

This application discloses a network slice management method and a device that is designed to improve network slice deployment efficiency. In the network slice management method, after obtaining indication information of a network slice template and performance requirement information of a target network slice, a first network management device may determine deployment information of the target network slice based on the two pieces of information, and may manage the target network slice based on the deployment information of the target network slice, without manual involvement. Therefore, network slice deployment efficiency can be improved.

16 Claims, 8 Drawing Sheets

(56) References Cited

U.S. PATENT DOCUMENTS

| | | | |
|---|---|---|---|
| 2016/0057234 A1* | 2/2016 | Parikh | H04L 67/16 709/226 |
| 2017/0054595 A1 | 2/2017 | Zhang et al. | |
| 2017/0141973 A1* | 5/2017 | Vrzic | H04L 41/5051 |
| 2017/0142591 A1* | 5/2017 | Vrzic | H04L 47/2408 |
| 2017/0164187 A1 | 6/2017 | Lu | |
| 2017/0332421 A1* | 11/2017 | Sternberg | H04W 12/069 |
| 2018/0054237 A1* | 2/2018 | Tseng | H04W 36/0033 |
| 2018/0132138 A1* | 5/2018 | Senarath | H04L 41/5041 |
| 2018/0191782 A1* | 7/2018 | Djordjevic | H04L 63/0428 |
| 2018/0317133 A1* | 11/2018 | Sciancalepore | H04W 16/02 |
| 2019/0029065 A1* | 1/2019 | Park | H04W 48/02 |
| 2019/0104455 A1* | 4/2019 | Park | H04W 36/0022 |
| 2019/0104461 A1* | 4/2019 | Yi | H04W 40/12 |
| 2019/0109768 A1* | 4/2019 | Senarath | H04L 41/0681 |
| 2019/0123963 A1* | 4/2019 | Tang | H04W 48/18 |
| 2019/0124508 A1* | 4/2019 | Watfa | H04W 4/18 |
| 2019/0191348 A1* | 6/2019 | Futaki | H04W 36/14 |
| 2019/0230584 A1 | 7/2019 | Lou et al. | |
| 2019/0260690 A1* | 8/2019 | Sun | H04L 47/2425 |
| 2019/0357129 A1* | 11/2019 | Park | H04W 88/14 |
| 2019/0386878 A1* | 12/2019 | Chou | H04W 4/50 |
| 2020/0014589 A1* | 1/2020 | Xu | H04L 41/0806 |
| 2020/0014608 A1* | 1/2020 | Xu | H04L 41/0806 |
| 2020/0015102 A1* | 1/2020 | Sun | H04L 41/0823 |
| 2020/0015158 A1* | 1/2020 | So | H04W 48/16 |
| 2020/0044919 A1* | 2/2020 | Yao | H04L 41/0806 |
| 2020/0052969 A1* | 2/2020 | Xu | H04L 41/5048 |
| 2020/0228419 A1* | 7/2020 | Xu | H04L 41/04 |
| 2020/0287800 A1* | 9/2020 | Xu | H04W 24/02 |
| 2020/0287801 A1* | 9/2020 | Xu | H04L 41/0886 |
| 2020/0313969 A1* | 10/2020 | Li | H04L 41/5048 |
| 2020/0382374 A1* | 12/2020 | Yi | H04L 41/0893 |
| 2020/0413244 A1* | 12/2020 | Park | H04W 12/06 |
| 2021/0352534 A1* | 11/2021 | Tiwari | H04L 41/5025 |

FOREIGN PATENT DOCUMENTS

| | | |
|---|---|---|
| CN | 106375987 A | 2/2017 |
| CN | 106412905 A | 2/2017 |
| CN | 106549806 A | 3/2017 |
| CN | 106550410 A | 3/2017 |
| CN | 106572516 A | 4/2017 |
| CN | 106657194 A | 5/2017 |
| CN | 106792692 A | 5/2017 |
| CN | 107040481 A | 8/2017 |
| EP | 2989751 A1 | 3/2016 |
| WO | 2014173264 A1 | 10/2014 |
| WO | WO-2019184967 A1 * | 10/2019 ......... H04L 41/0806 |

OTHER PUBLICATIONS

Motorola Mobility, Lenovo, Network Slices in NFV Deployments. SA WG2 Meeting #116, Jul. 11, 2016, Vienna, Austria, S2-163401, 5 pages.

XI Dan et al., Patent analysis of network slicing technology. Telecommunications Network Technology, No. 3, 2017, 5 pages.

\* cited by examiner

NETWORK SLICE MANAGEMENT METHOD AND DEVICE

CROSS-REFERENCE TO RELATED APPLICATIONS

This application is a continuation of International Application No. PCT/CN2018/106043, filed on Sep. 17, 2018, which claims priority to Chinese Patent Application No. 201710890324.0, filed on Sep. 27, 2017. The disclosures of the aforementioned applications are hereby incorporated by reference in their entireties.

TECHNICAL FIELD

This application relates to the field of communications technologies, and in particular, to a network slice management method and a device.

BACKGROUND

To provide a more comprehensive network service, a new generation mobile communications system may use network slice as an abstract representation of a logical function. To satisfy service requirements of different users and ensure service quality provided to different users, the mobile communications system needs to create one network slice for each service even though some services may have the same service quality requirement.

In some mobile communications systems, a network slice may be divided into a plurality of network slice subnets (NSS) based on network functions or other factors. In this way, the mobile communications system may select a plurality of network slice subnets based on a requirement of a to-be-created network slice, to generate the network slice.

Currently, the mobile communications system can automatically deploy a network slice by using a network slice template (NST). Using network slice template has an advantage of needing to design deployment of a plurality of network slice instances only once.

In some mobile communications systems, a plurality of pre-designed network slice templates are stored in a network management device. In this way, when deploying a network slice, the network management device can generate a corresponding network slice instance based on a selected network slice template.

However, after the network management device determines a network slice template required by creation of a network slice, a deployment flavor usually needs to be selected manually for the network slice. For example, information in the network slice such as the type of a network device or the quantity of network devices of each type needs to be determined. The network management device can then generate a corresponding network slice instance based on the selected deployment flavor and the network slice template.

Conventional network slice creation method requires manual involvement, and consequently its network slice deployment efficiency is low.

SUMMARY

This application provides a network slice management method and a device designed to improve network slice deployment efficiency.

According to a first aspect, an embodiment of this application provides a network slice management method. The method may include the following steps:

After obtaining indication information of a network slice template and performance requirement information of a target network slice, a first network management device may determine a network slice template indicated by the indication information of the network slice template, where the network slice template includes a correspondence between performance requirement information of a network slice and deployment information of the network slice; the first network management device then determines, based on the correspondence between the performance requirement information of the network slice and the deployment information of the network slice, deployment information that is of the target network slice and that corresponds to the performance requirement information of the target network slice; and finally the first network management device may manage/deploy the target network slice based on the determined deployment information of the target network slice.

In the foregoing method, without manual involvement, the first network management device can directly obtain the deployment information of the target network slice by using the indication information of the network slice template and the performance requirement information of the target network slice, to deploy the target network slice. Therefore, network slice deployment efficiency can be improved by using the method.

In a possible design, the first network management device may obtain the indication information of the network slice template and the performance requirement information of the target network slice in the following manners:

First manner: The first network management device receives the indication information of the network slice template and the performance requirement information of the target network slice that are sent from a CSMF unit in a network slice management system. For example, the first network management device receives a network slice deployment request sent from the CSMF unit, where the network slice deployment request carries the two pieces of information.

Second manner: The first network management device obtains the indication information of the network slice template and the performance requirement information of the target network slice that are entered by a user.

Through the design, the first network management device can successfully obtain the indication information of the network slice template and the performance requirement information of the target network slice.

In a possible design, the indication information of the network slice template may be an identity of the network slice template, or an address or storage location information of the network slice template.

In a possible design, the performance requirement information of the target network slice includes at least one of the following pieces information of the target network slice: a latency, a bandwidth, a coverage level, a coverage area, mobility, a user quantity, user distribution, a capacity, a throughput, reliability information, a transmission model, location information, and a success ratio.

Through the design, flexibility of managing, by the first network management device, the network slice by using the performance requirement information of the network slice can be improved.

In a possible design, when the target network slice does not include a target network component, the deployment information of the target network slice includes at least one of the following pieces of information: a deployment flavor of the target network slice and a deployment flavor of a network service corresponding to the target network slice.

Through the design, the first network management device can directly create the target network slice based on the deployment flavor of the target network slice and/or the deployment flavor of the network service corresponding to the target network slice that are/is indicated in the deployment information of the target network slice.

In a possible design, when the target network slice includes a target network component, the deployment information of the target network slice includes deployment information of the target network component.

Through the design, the first network management device or a second network management device that manages a network component can manage a corresponding target network component based on deployment information of each target network component that is included in the target network slice, to deploy the target network slice.

In a possible design, the deployment information of the target network component includes at least one of the following pieces of information: a deployment flavor of the target network component, a quantity of instances of the target network component, an instantiation level of the target network component, and deployment location constraint information of the target network component.

Through the design, flexibility of deploying, by the first network management device or the second network management device that manages the network component, the target network component can be improved.

In a possible design, the deployment information of the target network component includes at least one of the following pieces of information: a deployment flavor of a network service corresponding to the target network component, a quantity of instances of the network service corresponding to the target network component, an instantiation level of the network service corresponding to the target network component, and deployment location constraint information of the network service corresponding to the target network component.

Through the design, flexibility of deploying, by the first network management device or the second network management device that manages the network component, the target network component can be improved.

In a possible design, when the target network slice includes a target network component, the deployment information of the target network slice includes performance requirement information of the target network component.

Through the design, the first network management device or the second network management device can determine deployment information of a corresponding target network component based on performance requirement information of each target network component, to manage each target network component, and finally manage the target network slice.

In a possible design, the performance requirement information of the target network component includes at least one of the following pieces of information of the target network component: a latency, a bandwidth, a coverage level, a coverage area, mobility, a user quantity, user distribution, a capacity, a throughput, reliability information, a transmission model, location information, and a success ratio.

Through the design, flexibility of managing, by the first network management device or the second network management device, a network component by using performance requirement information of the network component can be improved.

In a possible design, when the target network slice includes a target network component, the deployment information of the target network slice includes a deployment information identity of the target network component or a performance requirement information identity of the target network component.

Through the design, the first network management device or the second network management device can determine deployment information of the target network component based on the deployment information identity of the target network component or the performance requirement information identity of the target network component.

In a possible design, the network slice template further includes indication information of a network component template, and the indication information of the network component template is used to instruct the first network management device or the second network management device to obtain the network component template.

Through the design, the first network management device or the second network management device first determines the network component template, and then determines the deployment information of the target network component in the network component template.

In a possible design, when the first network management device does not have a function of managing the network component, the first network management device sends the deployment information of the target network slice and the indication information of the network component template to the second network management device, so that the second network management device manages the target network component.

Through the design, the second network management device can determine the network component template by using the indication information of the network component template, and then can determine the deployment information of the target network component based on the network component template and the deployment information of the target network slice, to deploy the target network component.

In a possible design, the correspondence between the performance requirement information of the network slice and the deployment information of the network slice may be in the following representation forms.

First representation form: The performance requirement information of the network slice (or a performance requirement information identity of the network slice) and the deployment information of the network slice (or a deployment information identity of the network slice) are included in a same information element.

Second representation form: An information element of the performance requirement information of the network slice further includes the deployment information of the network slice (or a deployment information identity of the network slice).

Third representation form: An information element of the deployment information of the network slice further includes the performance requirement information of the network slice (or a performance requirement information identity of the network slice).

Fourth representation form: The correspondence is a deployment script or indication information of a deployment script, where the deployment script is used to determine the corresponding deployment information of the network slice based on the performance requirement information of the network slice, and the indication information of the deployment script is used to obtain the deployment script, and may be an address or storage location information of the deployment script, for example, a uniform resource locator (URL) address of the deployment script.

Through the design, a representation form of the correspondence between the performance requirement information of the network slice and the deployment information of the network slice can be made more flexible.

According to a second aspect, an embodiment of this application provides a network slice management method. The method includes the following steps:

A second network management device receives deployment information of a target network component from a first network management device, and then the second network management device may create the target network component based on the deployment information of the target network component.

In the method, without manual involvement, the second network management device can directly obtain the deployment information of the target network component, to deploy the target network component. Therefore, network component deployment efficiency can be improved by using the method.

According to a third aspect, an embodiment of this application further provides a network slice management method. The method includes the following steps:

After receiving indication information of a network component template and performance requirement information of a target network component from a first network management device, a second network management device may determine the network component template indicated by the indication information of the network component template, where the network component template includes a correspondence between performance requirement information of a network component and deployment information of the network component; the second network management device then determines, based on the correspondence between the performance requirement information of the network component and the deployment information of the network component, deployment information that is of the target network component and that corresponds to the performance information of the target network component; and finally the second network management device may manage/deploy the target network component based on the determined deployment information of the target network component.

In the foregoing method, without manual involvement, the second network management device can directly obtain the deployment information of the target network component by using the indication information of the network component template and the performance requirement information of the target network component, to manage the target network component. Therefore, network component deployment efficiency is improved.

In a possible design, the correspondence between the performance requirement information of the network component and the deployment information of the network component may be in the following representation forms.

First representation form: The performance requirement information of the network component (or a performance requirement information identity of the network component) and the deployment information of the network component (or a deployment information identity of the network component) are included in a same piece of information.

Second representation form: An information element of the performance requirement information of the network component further includes the deployment information of the network component (or a deployment information identity of the network component).

Third representation form: An information element of the deployment information of the network component further includes the performance requirement information of the network component (or a performance requirement information identity of the network component).

Fourth representation form: The correspondence is a deployment script or indication information of a deployment script, where the deployment script is used to determine the corresponding deployment information of the network component based on the performance requirement information of the network component, and the indication information of the deployment script is used to obtain the deployment script, and may be an address or storage location information of the deployment script, for example, a URL address of the deployment script.

Through the design, a representation form of the correspondence between the performance requirement information of the network component and the deployment information of the network component can be more flexible.

According to a fourth aspect, an embodiment of this application provides a first network management device, including units or modules configured to perform the steps according to the first aspect.

According to a fifth aspect, an embodiment of this application provides a second network management device, including units or modules configured to perform the steps according to the second aspect or the third aspect.

According to a sixth aspect, this application provides a first network management device, including at least one processing element and at least one storage element. The at least one storage element is configured to store a program and data, and the at least one processing element is configured to perform the method according to the first aspect of this application.

According to a seventh aspect, this application provides a second network management device, including at least one processing element and at least one storage element. The at least one storage element is configured to store a program and data, and the at least one processing element is configured to perform the method according to the second aspect or the third aspect of this application.

According to an eighth aspect, an embodiment of this application further provides a computer storage medium. The storage medium stores a software program. When read and executed by one or more processors, the software program may implement the method according to the first aspect to the third aspect or any design of any one of the foregoing aspects.

According to a ninth aspect, an embodiment of this application further provides a computer program product including an instruction. When run on a computer, the computer program product enables the computer to perform the methods according to the foregoing aspects.

According to a tenth aspect, an embodiment of this application provides a chip system. The chip system includes a processor, configured to support a first network management device or a second network management device in implementing the functions according to the foregoing aspects. In a possible design, the chip system further includes a memory. The memory is configured to store a program instruction and data that are necessary for the first network management device or the second network management device. The chip system may include a chip, or may include a chip and another discrete device.

In the solution provided in the embodiments of this application, after obtaining the indication information of the network slice template and the performance requirement information of the target network slice, the first network management device may determine the deployment information of the target network slice based on the two pieces of information, and may manage the target network slice based on the deployment information of the target network slice. In the foregoing solution, without manual involvement, the first network management device can directly obtain the deployment information of the target network slice by using the indication information of the network slice template and the performance requirement information of the target network slice, to deploy the target network slice. Therefore, network slice deployment efficiency can be improved by using the solution.

DESCRIPTION OF EMBODIMENTS

Figure 1:
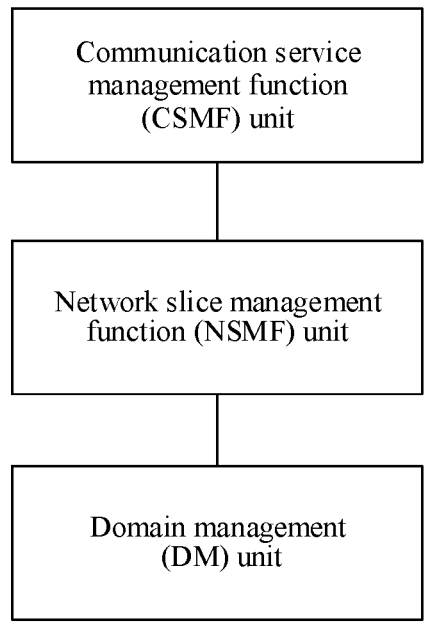
FIG. 1 is a schematic architectural diagram of a network slice management system according to an embodiment of this application.

This application provides a network slice management method and a device, to improve network slice deployment efficiency. The method and the device are based on a same inventive concept. A problem-resolving principle of the method is similar to that of the device. Therefore, mutual reference may be made for implementation of the device and the method. Repeated parts are not described in detail again.

In the solution provided in the embodiments of this application, after obtaining indication information of a network slice template and performance requirement information of a target network slice, a first network management device may determine deployment information of the target network slice based on the two pieces of information, and may manage the target network slice based on the deployment information of the target network slice. In the foregoing solution, without manual involvement, the first network management device can directly obtain the deployment information of the target network slice by using the indication information of the network slice template and the performance requirement information of the target network slice, to deploy the target network slice. Therefore, the network slice deployment efficiency can be improved by using the solution.

The following describes some terms in this application, to help a person skilled in the art have a better understanding.

(1) A network slice is a communication resource that is in a mobile communications system and that ensures that a bearer service can meet a requirement of a service level agreement (SLA).

To ensure isolation of logical functions of different network slices, communication resources in the different network slices also need to be isolated from each other. For example, the communication resources in the different network slices are isolated physically, or the communication resources in the different network slices are logically isolated.

The network slice is a combination of a network function and a communication resource that are required for completion of some services, and provides a corresponding network service to a user. Therefore, the network slice may be considered as a complete logical network.

In the embodiments of this application, network slice is a general concept. A conventional network or a dedicated network may also be considered as a network slice, or a network having some of network functions may also be considered as a network slice.

(2) A network component is a component of a network slice, and may also be referred to as a network slice subnet, a subnet, a domain, or the like. The network slice includes at least one network component. A mobile communications system may divide the network slice into a plurality of network components based on network functions.

For example, an end-to-end network may be divided, based on network functions, into the following components/domains: a core network (CN) component/domain, a transport network (TN) component/domain, and an access network (AN) component/domain. Therefore, when a network slice has a network function of at least one of the foregoing three domains, the network slice may be divided into a corresponding quantity of network components.

When a network slice has network functions of the foregoing core network domain and transport network domain, the network slice may include two network components, namely, a CN network component and a TN network component. The core network component has a network function of the CN domain, and the TN network component has a network function of the TN domain.

(3) A network slice template, used to deploy a network slice, is a template used to create the network slice (namely, a network slice instance). A network management device may determine deployment information of a target network slice by using the network slice template, to manage the target network slice. It should be noted that the name of the network slice template is not limited in this application, and the network slice template may also be referred to as a network slice descriptor or the like.

The network slice template includes a correspondence between performance requirement information of a network slice and deployment information of the network slice. There is at least one correspondence. In this way, after obtaining performance requirement information of the to-be-deployed/managed target network slice, the network management device can directly determine, based on the foregoing correspondence in the network slice template, the deployment information that is of the target network slice and that corresponds to the performance requirement information of the target network slice, to deploy the target network slice. Definitely, the network management device may determine, by using the network slice template, the deployment information of the network slice based on the performance requirement information of the network slice, so that flexibility of managing the network slice is improved.

Optionally, when the network slice deployed based on the network slice template includes a network component, the network slice template further includes indication information used to indicate a network component template for deploying the network component.

In addition, it should be further noted that a deployment action is not limited in this application. Therefore, deployment may also be replaced with another action such as instantiation, creation, or management.

(4) A network component template, used to deploy a network component, is a template used to create the network component (namely, a network component instance). A network management device may determine deployment information of a target network component by using a network slice template, to manage the target network component. It should be noted that the name of the network component template is not limited in this application, and the network component template may also be referred to as a network component descriptor or the like.

The network component template includes a correspondence between performance requirement information of a network component and deployment information of the network component. There is at least one correspondence. In this way, after obtaining performance requirement information of the to-be-deployed/managed target network component, the network management device can directly determine, based on the foregoing correspondence in the network component template, the deployment information that is of the target network component and that corresponds to the performance requirement information of the target network component, to deploy the target network slice. The network management device may determine, by using the network component template, the deployment information of the network component based on the performance requirement information of the network component, so that flexibility of managing the network component is improved, and flexibility of managing a network slice is improved.

(5) Performance requirement information of a network slice is used to represent a performance requirement for the network slice. The performance requirement information of the network slice may include at least one performance parameter of the network slice.

For example, the performance requirement information of the network slice includes at least one of the following pieces of information of the network slice: a latency, a bandwidth, a coverage level, a coverage area, mobility, a user quantity (user number), user distribution, a capacity, a throughput (throughout), reliability information, a transmission model, location information, and a success ratio.

The following explains each parameter of the network slice.

a. The latency of the network slice is a response time of the network slice. For example, a latency of a network slice is 10 milliseconds (ms).

b. The bandwidth of the network slice is a bandwidth that can be provided by the network slice. For example, a bandwidth of a network slice is 10 MHz.

c. The coverage level of the network slice represents strength of the network slice. In the embodiments of this application, strong coverage, common coverage, weak coverage, or the like may be used for representation, or indoor coverage, outdoor coverage, suburban area coverage, or the like may be used for representation.

d. The coverage area of the network slice is used to describe a network coverage area in which the network slice is used, for example, Shanghai.

e. The mobility of the network slice is used to describe a mobile status of a terminal device that is connected to the network slice, for example, a mobile or a fixed status. Optionally, the mobility of the network slice may further describe a movement rate of the terminal device that is connected to the network slice.

f. The user quantity of the network slice is used to describe a maximum quantity of users that the network slice carries. For example, if it is estimated that 1 million users are to be connected to a network slice before deployment, a user quantity is required to be greater than or equal to 1 million.

g. The user distribution of the network slice is used to describe distribution of a terminal device (equivalent to a user) that is connected to the network slice. For example, if 1 million users are to be connected to the slice in an area, the 1 million users are evenly distributed in this area.

h. The capacity of the network slice is used to describe a maximum quantity of users connected to the network slice. For example, it is likely that a maximum of 1 million users are to be connected to the network slice.

i. The throughput of the network slice is used to describe a capability of the network slice to forward data. For example, if a throughput of a network slice is 100 Mbit/s, it represents that the network slice supports transmission of 100 Mbit of data in one second.

j. The reliability information of the network slice is used to describe the network slice in terms of a capability to implement a function of the network slice or a degree of continuous working.

k. The transmission model of the network slice is used to describe a data transmission status of a user connected to the network slice. For example, a meter reading user uses, once for each day, a meter reading service provided by the network slice, and a size of each packet is 10 M.

l. The location information of the network slice is used to describe a deployment location of the network slice. For example, the network slice needs to be deployed in an area.

m. The success ratio of the network slice is used to describe a success ratio of use of the network slice by a terminal device, and may include a reporting success ratio or a delivery success ratio.

Optionally, the performance requirement information of the network slice may further include a value or a value range that corresponds to the foregoing information.

(6) Deployment information of a network slice is the description information of a specific instance for deploying a network slice.

Optionally, when the network slice does not include a network component, the deployment information of the network slice may be at least one of the following pieces of information: a deployment flavor of the network slice and a deployment flavor of a network service corresponding to the network slice.

The deployment flavor of the network slice specifies at least one of a type of a network function, a quantity of network functions of each type, and a capacity of the network function that are in the network slice. For example, a deployment flavor of a network slice is: one access and mobility management function (AMF) instance+two session management function (SMF) instances+two user plane function (UPF) instances+three access network devices (for example, a gNB).

The deployment flavor of the network service corresponding to the network slice specifies information about a virtual component (for example, a virtualized network function (VNF) and/or a virtualized link (VL)) included in the network service corresponding to the network slice. Optionally, the information about the virtual component includes at least one of the following pieces of information: virtual component requirement information (for example, VNF profile information and/or VL profile information), virtual component description information (for example, a virtualized network function descriptor (VNFD) identity (ID) and/or a virtualized link descriptor (VLD) ID), and a virtual component flavor (for example, including a VNF flavor ID and/or a VL Flavor ID).

When the network slice includes at least one network component, at least the following several implementations are included:

In a first implementation, the deployment information of the network slice may include deployment information of each network component. In this way, a network management device may deploy a corresponding network component based on the deployment information of each network component, to deploy the network slice.

In a second implementation, the deployment information of the network slice may include performance requirement information of each network component. In this way, a network management device may determine deployment information of a corresponding network component based on the performance requirement information of each network component, to deploy each network component, and finally deploy the network slice.

In a third implementation, the deployment information of the network slice may include a deployment information identity (ID) of each network component. Correspondingly, the deployment information identity of the network component is also included in a network component template, and the network component template further includes deployment information that is of the network component and that is indicated by the deployment information identity of the network component.

In a fourth implementation, the deployment information of the network slice may include a performance requirement information identity of each network component. Correspondingly, the performance requirement information identity of the network component is also included in a network component template. In addition, the network component template further includes a correspondence between performance requirement information identity of a network component and deployment information of the network component; or further includes performance requirement information that is of the network component and that is indicated by the performance requirement information identity of the network component and a correspondence between performance requirement information of a network component and the deployment information of the network component.

(7) Deployment information of a network component is the description information of a specific instance for deploying a network component.

Optionally, the deployment information of the network component may include at least one of the following pieces of information: a deployment flavor of the network component, a quantity of instances of the network component, an instantiation level of the network component, and deployment location constraint information of the network component.

The deployment flavor of the network component is similar to the deployment flavor of the network slice, and specifies at least one of a type of a network function, a quantity of network functions of each type, and a capacity of the network function that are in the network component. For example, a deployment flavor of a core network component is: one AMF instance+one SMF instance+three UPF instances; and a deployment flavor of an access network component is: four access network devices.

Optionally, the deployment flavor of the network component may be a deployment flavor identity of a network service corresponding to the network component.

The quantity of instances of the network component specifies a quantity of instances of a network component that are created by a network device based on the deployment information of the network component.

The instantiation level of the network component specifies a capacity of the network component. Optionally, the instantiation level of the network component may be an instantiation level identity of the network service corresponding to the network component.

The deployment location constraint information of the network component specifies a deployment location requirement of the network component. For example, the network component needs to be deployed in a data center that is close to a base station.

Optionally, the deployment information of the network component may include at least one of the following pieces of information: a deployment flavor of the network service corresponding to the network component, a quantity of instances of the network service corresponding to the network component, an instantiation level of the network service corresponding to the network component, and deployment location constraint information of the network service corresponding to the network component.

Optionally, the network service corresponding to the network component includes a virtual component such as a VNF or a VL.

(8) Performance requirement information of a network component is used to represent a performance requirement of the network component. The performance requirement information of the network component may include at least one performance parameter of the network component.

Similar to the performance requirement information of a network slice, the performance requirement information of the network component may include at least one of the following parameters information of the network component: a latency, a bandwidth, a coverage level, a coverage area, mobility, a user quantity, user distribution, a capacity, a throughput, reliability information, a transmission model, location information, and a success ratio.

The following explains each parameter of the network component.

a. The latency of the network component is a response time of the network component. For example, a latency of a network component is 5 milliseconds (ms).

b. The bandwidth of the network component is a bandwidth that can be provided by the network component. For example, a bandwidth of a network component is 10 MHz.

c. The coverage level of the network component represents strength of the network component. In the embodiments of this application, strong coverage, common coverage, weak coverage, or the like may be used for representation, or indoor coverage, outdoor coverage, suburban area coverage, or the like may be used for representation.

d. The coverage area of the network component is used to describe a network coverage area in which the network component is used, for example, Shanghai.

e. The mobility of the network component is used to describe a mobile status of a terminal device that is connected to the network component, for example, a mobile or a fixed status. Optionally, the mobility of the network component may further describe a movement rate of the terminal device that is connected to the network component.

f. The user quantity of the network component is used to describe a maximum quantity of users that the network component carries. For example, if it is estimated that 500,000 users are to be connected to a network component before deployment, a user quantity is required to be greater than or equal to 500,000.

g. The user distribution of the network component is used to describe the distribution of users connected to the network component.

h. The capacity of the network component is used to describe a maximum quantity of users connected to the network component. For example, it is likely that a maximum of 1 million users are to be connected to the network slice.

i. The throughput of the network component is used to describe a capacity of the network component to forward data. For example, if a throughput of a network component is 100 Mbit/s, it represents that the network component supports transmission of 100 Mbit of data in one second.

j. The reliability information of the network component is used to describe the network component in terms of a capability to implement a function of the network component or a degree of continuous working.

k. The transmission model of the network component is used to describe a data transmission status of a user connected to the network component. For example, a meter reading user uses, once for each day, a meter reading service provided by the network slice, and a size of each packet is 10 M.

l. The location information of the network component is used to describe a deployment location of the network component. For example, the network component needs to be deployed in an area.

m. The success ratio of the network component is used to describe a success ratio of use of the network component by a terminal device, and may include a reporting success ratio or a delivery success ratio.

Optionally, the performance requirement information of the network component may further include a value or a value range that corresponds to the foregoing information.

Optionally, when the network slice includes a plurality of network components, performance requirement information of the plurality of network components may further include a performance ratio of any one of the foregoing information of the plurality of network components.

For example, the performance requirement information of the network slice includes a latency of 10 milliseconds (ms), and the network slice includes three network components, namely, an AN network component, a TN network component, and a CN network component.

Therefore, a ratio that is between latencies of the foregoing three network components and that is included in the performance requirement information of the network component may be: a latency of the AN network component:a latency of the TN network component:a latency of the CN network component=2:1:2. Alternatively, a latency included in performance requirement information of the AN network component is 4 ms, a latency included in performance requirement information of the TN network component is 2 ms, and a latency included in performance requirement information of the CN network component is 4 ms.

(9) A network management device may manage a network slice/a network component, for example, manage or maintain a life cycle of the network slice/the network component.

(10) A deployment script, in this application, includes a first deployment script that represents a correspondence between performance requirement information of a network slice and deployment information of the network slice, and a second deployment script that represents a correspondence between performance requirement information of a network component and deployment information of the network component.

The deployment script is a set of programs. A network management device may run the deployment script and calculate the deployment information of the network slice or the deployment information of the network component.

(11) The term "and/or" describes an association relationship between associated objects and represents that three relationships may exist. For example, A and/or B may represent the following three cases: Only A exists, both A and B exist, and only B exists. The character "/" usually indicates an "or" relationship between the associated objects.

It should be noted that "plurality of" in this application means two or more.

In addition, it should be understood that, in descriptions of this application, terms such as "first" and "second" are merely used for distinction and description, and shall not be understood as indication or implication of relative importance or an indication or implication of a sequence.

The following describes the embodiments of this application in detail with reference to the accompanying drawings.

FIG. 1 shows a possible network slice management system architecture to which a network slice management method is applicable according to an embodiment of this application. The network slice management system may create, deploy, and manage a network slice, for example, perform network performance monitoring, fault management, and performance parameter adjustment on a network slice in a running state. As shown in FIG. 1, the system may include a communication service management function (CSMF) unit, a network slice management function (NSMF) unit, and a domain management (DM) unit.

The CSMF unit is mainly configured to obtain a service requirement of an operator and/or a third-party tenant, and convert the service requirement into performance requirement information of a network slice. The CSMF unit further has a function such as service management.

The name of the CSMF unit is not limited in this embodiment of this application. The CSMF unit may also be referred to as a service management device.

Optionally, the CSMF unit may be a device independently deployed, or may be integrated and deployed with another management function unit in the same device. Therefore, the CSMF unit may also be an operation support system (OSS), a business support system (BSS), a service management unit, a service orchestration unit, or a service management and orchestration unit.

The NSMF unit has an end-to-end network management function and/or an end-to-end network orchestration function. Specifically, the NSMF unit may have some or all of the following functions:

an end-to-end network management function, for example, functions such as life cycle management of the network slice, management of a network slice template, fault management of the network slice, performance management of the network slice, and/or parameter configuration management of the network slice;

mapping between the network slice, a network component, and a network function;

coordinating network communication resources provided by different domains (for example, an access network domain, a core network domain, and a transport domain), or coordinating sub-SLAs that the different domains can reach, to ensure that a sum of the sub-SLAs that are reached by all the domains matches an SLA of an end-to-end network;

decomposing performance requirement information of the end-to-end network into performance requirement information of at least one domain; and uniformly orchestrating subnets and network functions that are provided by various domains, so that subnets or network functions that are provided by different domains can meet a requirement of a target service or a network (for example, a requirement for an SLA, a requirement for a key performance indicator (KPI), or a requirement for quality of service (QoS)).

A name of the NSMF unit is not limited in this embodiment of this application either. The NSMF unit may also be referred to as a network management (NM) unit, an inter-domain management unit, an inter-domain network slice management unit, a network slice management unit, or the like.

In addition, the NSMF unit may be a device independently deployed, or may be integrated and deployed with another management function unit in a same device. Therefore, the NSMF unit may also be a network orchestration unit, a network management and orchestration unit, a service management unit, a service orchestration unit, a service management and orchestration unit, a network functions virtualization orchestrator (NFVO), an OSS, or the like.

In addition, it should be noted that the foregoing network or end-to-end network may also be referred to as a network slice or an end-to-end network slice, including at least one of the following: a core network domain, an access network domain, and a transport network domain. The foregoing domains or subnets may also be referred to as network components or network slice subnets. This is not limited in this embodiment of this application.

The DM unit has a subnet management function and/or a subnet orchestration function. Specifically, the DM unit may have some or all of the following functions:

a domain management function, for example, functions such as life cycle management of a network component (specifically including: management such as creation, update, and deletion of the network component), fault management of the network component, performance management of the network component, and/or parameter configuration management of the network component;

a service management function, for example, functions such as life cycle management of a service, fault management of the service, performance management of the service, and parameter configuration management of the service; and coordinating network resources (for example, a network function (NF) and a network element (NE)), to perform uniform orchestration.

A name of the DM unit is not limited in this embodiment of this application. The DM unit may also be referred to as a domain management unit, a network slice subnet management function (NS SMF) unit, a network component management unit, or the like.

In addition, the DM unit may be a device independently deployed, or may be integrated and deployed with another management function unit in a same device. Therefore, the DM unit may also be a network management unit, a network orchestration unit, a network management and orchestration unit, a network element management unit, a network function management unit, a service management unit, a service orchestration unit, a service management and orchestration unit, an NFVO, an OSS, or the like.

Based on the network slice management system shown in FIG. 1, the foregoing subnet may include one or more of the following: an AN domain (for example, an AN NF), a CN domain (for example, a CN NF), and a TN domain. Correspondingly, there may also be one or more DM units that manage the subnet. The foregoing subnet may be considered as an NF or an NE.

Figure 2:
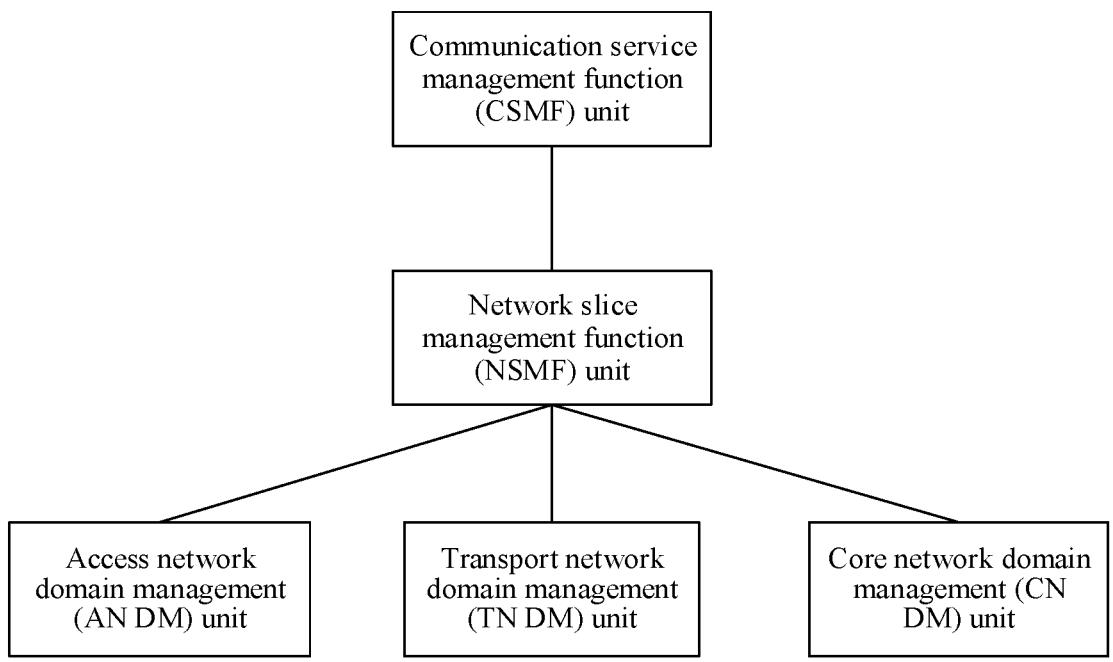
FIG. 2 is a schematic architectural diagram of another network slice management system according to an embodiment of this application.

In a network slice management system shown in FIG. 2:
when the subnet that is managed by the DM unit includes the AN domain, the DM unit may include an AN DM unit;
when the subnet that is managed by the DM unit includes the CN domain, the DM unit may include a CN DM unit; and
when the subnet that is managed by the DM unit includes the TN domain, the DM unit may include a TN DM unit.

The TN DM unit has a transport network management function and/or a transport network orchestration function. Specifically, the TN DM unit may have some or all of the following functions:

managing the transport network domain, for example, functions such as life cycle management of the transport network domain (specifically including: management such as creation, update, and deletion of the transport network domain), fault management of the transport network domain, performance management of the transport network domain, or parameter configuration management of the transport network domain.

In addition, a quantity of subnets that are managed by one DM unit is not limited in this embodiment of this application. Therefore, one DM unit may manage a plurality of subnets. For example, when the subnets managed by the DM unit include the AN domain and the CN domain, the DM unit may be referred to as a mix DM unit.

It should be noted that a distribution form of the functional units in the network slice management system is not limited in FIG. 1 and FIG. 2. Optionally, the network slice management system may also include another functional unit that is formed by converging the foregoing plurality of network management functions, for example, a functional unit formed by converging the CSMF unit and the NSMF unit, or a functional unit formed by converging the NSMF unit and the DM unit.

Figure 3:
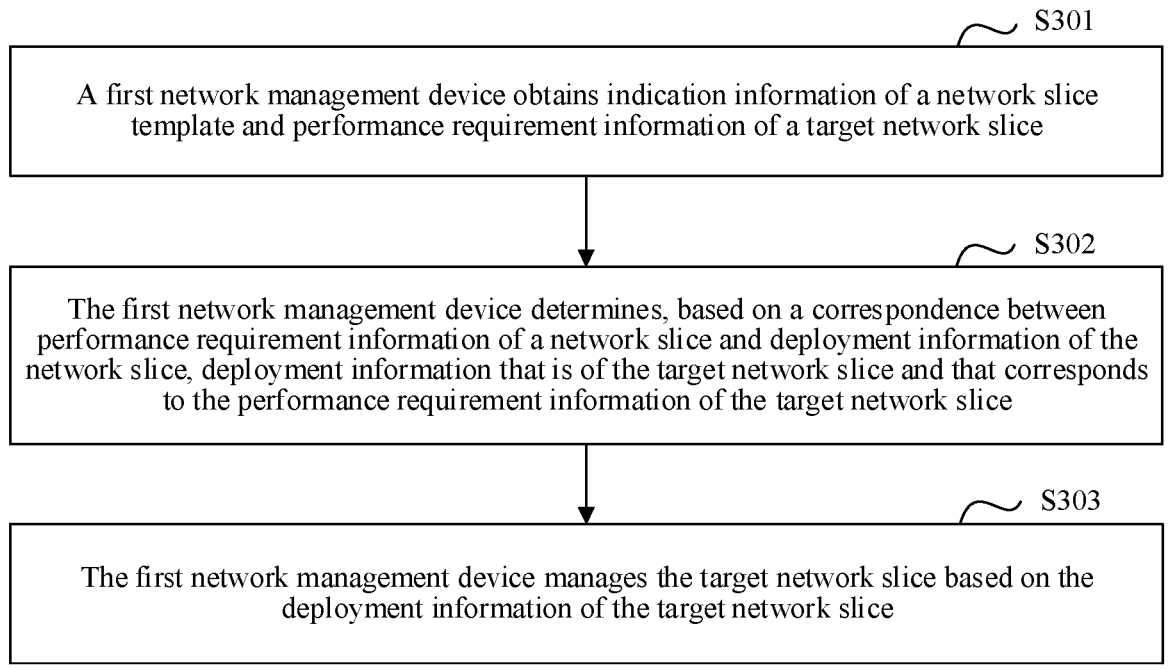
FIG. 3 is a flowchart of a network slice management method according to an embodiment of this application.

An embodiment of this application provides a network slice management method. The method is applicable to the network slice management system shown in FIG. 1 or FIG. 2. As shown in FIG. 3, the method includes the following procedure.

S301: A first network management device obtains indication information of a network slice template and performance requirement information of a target network slice.

The indication information of the network slice template is used to instruct the first network management device to obtain the network slice template. Therefore, after obtaining the indication information of the network slice template in S301, the first network management device may determine the network slice template. The network slice template includes a correspondence between performance requirement information of a network slice and deployment information of the network slice.

Optionally, the first network management device is a device having a function of the NSMF unit in the network slice management system shown in FIG. 1 or FIG. 2, or is a device having at least functions of the NSMF unit and the DM unit.

The first network management device may perform S301 in, but not limited to, the following manners:

First manner: The first network management device receives the indication information of the network slice template and the performance requirement information of the target network slice that are sent from the CSMF unit in the network slice management system. For example, the first network management device receives a network slice deployment request sent from the CSMF unit, where the network slice deployment request carries the two pieces of information.

Second manner: The first network management device obtains the indication information of the network slice template and the performance requirement information of the target network slice that are entered by a user.

The first network management device stores at least one network slice template. When there is a plurality of network slice templates, before managing the target network slice, the first network management device needs to first determine, by using the indication information of the network slice template, the network slice template used to deploy the target network slice.

In a possible design, the indication information of the network slice template may be an identity of the network slice template, or an address or storage location information of the network slice template.

In a possible design, when there is one piece of performance requirement information that is of a network slice and that is included in each network slice template stored in the first network management device, the performance requirement information that is of the network slice and that is included in each network slice template may also be used to identify the corresponding network slice template.

Optionally, before S301, the first network management device may load the network slice template through the following steps:

a. The first network management device obtains a network slice template load request, for example, the first network management device receives the network slice template load request sent from the CSMF unit, or obtains the network slice template load request entered by the user. The network slice template load request includes the to-be-loaded network slice template.

b. The first network management device loads, based on the network slice template load request, the network slice template included in the network slice template load request.

Optionally, the correspondence that is between the performance requirement information of the network slice and the deployment information of the network slice and that is included in the network slice template may be in a plurality of representation forms, which may include but are not limited to the following representation forms, so that the representation form of the correspondence is more flexible.

First representation form: The performance requirement information of the network slice (or a performance requirement information identity of the network slice) and the deployment information of the network slice (or a deployment information identity of the network slice) are included in a same information element.

Second representation form: An information element of the performance requirement information of the network slice further includes the deployment information of the network slice (or a deployment information identity of the network slice).

Third representation form: An information element of the deployment information of the network slice further includes the performance requirement information of the network slice (or a performance requirement information identity of the network slice).

Fourth representation form: The correspondence is a deployment script or indication information of a deployment script, where the deployment script is used to determine the corresponding deployment information of the network slice based on the performance requirement information of the network slice, and the indication information of the deployment script is used to obtain the deployment script, and may be an address or storage location information of the deployment script, for example, a uniform resource locator (URL) address of the deployment script.

The network slice template includes the foregoing correspondence. In this way, after obtaining the performance requirement information of the to-be-deployed/managed target network slice, the first network management device can directly determine, based on the foregoing correspondence in the network slice template, deployment information that is of the target network slice and that corresponds to the performance requirement information of the target network slice, to deploy the target network slice. The first network management device may determine, by using the network slice template, the deployment information of the network slice based on the performance requirement information of the network slice, so that flexibility of managing the network slice is improved.

Optionally, the performance requirement information of the target network slice includes at least one of the following parameters of the target network slice: a latency, a bandwidth, a coverage level, a coverage area, mobility, a user quantity, user distribution, a capacity, a throughput, reliability information, a transmission model, location information, and a success ratio.

S302: The first network management device determines, based on the correspondence between the performance requirement information of the network slice and the deployment information of the network slice, the deployment information that is of the target network slice and that corresponds to the performance requirement information of the target network slice.

The network slice may be divided into at least one network component. Therefore, depending on whether the target network slice is divided into a network component, specific content included in the deployment information of the network slice may include but is not limited to the following possible implementations:

First implementation: In a scenario in which the target network slice does not include a target network component, the deployment information of the target network slice includes at least one of the following pieces of information: a deployment flavor of the target network slice and a deployment flavor of a network service corresponding to the target network slice.

Through the foregoing first implementation, the first network management device can directly manage the target network slice based on the deployment flavor of the target network slice and/or the deployment flavor of the network service corresponding to the target network slice that are/is indicated in the deployment information of the target network slice.

Example 1

In the first implementation, the correspondence between the performance requirement information of the network slice and the deployment information of the network slice may be shown in Table 1.

TABLE 1

| Performance requirement information of the network slice | Deployment information of the network slice |
| --- | --- |
| Latency: 10 ms | One AMF entity + two SMF entities + two UPF instances + three gNBs |
| Latency: 10 ms; mobility: mobile; and user quantity: 1 million | Three AMF entities + six SMF entities + six UPF instances + 12 gNBs |
| Throughput: 100 Mbit/s; and bandwidth: 50 MHz | VNF profile information 1, VNFD ID 1, VL profile information 1, and VLD ID 1 |
| Performance requirement information of the network slice | Deployment information of the network slice |
| Latency: 8 ms; mobility: mobile; and throughput: 100 Mbit/s | One AMF entity + two SMF entities + two UPF instances + six gNBs; and VNF profile information 2, VNFD ID 2, VL profile information 2, and VLD ID 2 |

Second implementation: In a scenario in which the target network slice includes at least one target network component, the deployment information of the target network slice includes deployment information of each target network component.

Optionally, the deployment information of each target network component includes at least one of the following pieces of information: a deployment flavor of the target network component, a quantity of instances of the target network component, an instantiation level of the target network component, and deployment location constraint information of the target network component.

Alternatively and optionally, the deployment information of each target network component includes at least one of the following pieces of information: a deployment flavor of a network service corresponding to the target network component, a quantity of instances of the network service corresponding to the target network component, an instantiation level of the network service corresponding to the target network component, and deployment location constraint information of the network service corresponding to the target network component.

Through the foregoing second implementation, the first network management device or a second network management device that manages a network component can manage a corresponding target network component based on deployment information of each target network component that is included in the target network slice, to manage the target network slice.

Example 2

In the second implementation, the correspondence between the performance requirement information of the network slice and the deployment information of the network slice, namely, a correspondence between the performance requirement information of the network slice and deployment information of the network component, may be shown in Table 2.

TABLE 2

| Performance requirement information of the network slice | Deployment information of the network component |
| --- | --- |
| Latency: 10 ms | A quantity of instances of a CN network component is 1, and the instance includes: one AMF entity + two SMF entities + two UPF instances; and a quantity of instances of a TN network component is 1, and the instance includes: three gNBs |
| Latency: 10 ms; mobility: mobile; and user quantity: 1 million | A quantity of instances of a CN network component is 3, and each CN network component includes: one AMF entity + two SMF entities + two UPF instances; and a quantity of instances of a TN network component is 4, and each TN network component includes: three gNBs |

Third implementation: In a scenario in which the target network slice includes at least one target network component, the deployment information of the target network slice includes performance requirement information of each target network component.

Optionally, the performance requirement information of each target network component includes at least one of the following parameters of the target network component: a latency, a bandwidth, a coverage level, a coverage area, mobility, a user quantity, user distribution, a capacity, a throughput, reliability information, a transmission model, location information, and a success ratio.

Through the foregoing third implementation, the first network management device or the second network management device can determine the deployment information of a corresponding target network component based on the performance requirement information of each target network component, to manage each target network component, and finally manage the target network slice.

Example 3

In the third implementation, the correspondence between the performance requirement information of the network slice and the deployment information of the network slice, namely, a correspondence between the performance requirement information of the network slice and performance requirement information of the network component, may be shown in Table 3.

TABLE 3

| Performance requirement information of the network slice | Performance requirement information of the network component |
| --- | --- |
| Latency: 10 ms | CN network component: a latency is 4 ms; TN network component: a latency is 3 ms; and AN network component: a latency is 3 ms |

TABLE 3-continued

| Performance requirement information of the network slice | Performance requirement information of the network component |
|---|---|
| Latency: 10 ms; mobility: mobile; and user quantity: 1 million | CN network component: a latency is 4 ms, mobility is a mobile status, and a user quantity is 1 million; TN network component: a latency is 3 ms; and AN network component: a latency is 3 ms, mobility is a mobile status, and a user quantity is 1 million |

Fourth implementation: In a scenario in which the target network slice includes at least one target network component, the deployment information of the target network slice includes a deployment information identity of the target network component or a performance requirement information identity of the target network component.

Through the foregoing fourth implementation, the first network management device or the second network management device can determine deployment information of the target network component based on the deployment information identity of the target network component or the performance requirement information identity of the target network component.

Example 4

In the fourth implementation, the correspondence between the performance requirement information of the network slice and the deployment information of the network slice, namely, a correspondence between the performance requirement information of the network slice and deployment information identity of the network component, may be shown in Table 4; or the correspondence between the performance requirement information of the network slice and the deployment information of the network slice, namely, a correspondence between the performance requirement information of the network slice and performance requirement information identity of the network component, is shown in Table 5.

TABLE 4

| Performance requirement information of the network slice | Deployment information ID of the network component |
|---|---|
| Latency: 10 ms | Deployment information ID 1 of a CN network component, deployment information ID 3 of a TN network component, and deployment information ID 5 of an AN network component |
| Latency: 10 ms; mobility: mobile; and user quantity: 1 million | Deployment information ID 5 of a CN network component, deployment information ID 3 of a TN network component, and deployment information ID 10 of an AN network component |

TABLE 5

| Performance requirement information of the network slice | Performance requirement information ID of the network component |
|---|---|
| Latency: 10 ms | Performance requirement information ID 3 of a CN network component, performance requirement information ID 4 of a TN network component, and performance requirement information ID 7 of an AN network component |
| Latency: 10 ms; mobility: mobile; and user quantity: 1 million | Performance requirement information ID 5 of a CN network component, performance requirement information ID 8 of a TN network component, and performance requirement information ID 4 of an AN network component |

S303: The first network management device manages the target network slice based on the deployment information of the target network slice.

The first network management device may perform S303 in the following manners:

First manner: When the deployment information of the target network slice is in the foregoing first implementation, the first network management device may directly manage the target network slice based on the deployment information of the target network slice.

Second manner: In a scenario in which the first network management device is the device having at least the functions of the NSMF unit and the DM unit, when the deployment information of the target network slice is in the foregoing second implementation, the first network management device may directly manage the corresponding target network component based on the deployment information of each target network component that is included in the target network slice, to manage the target network slice.

Third manner: In a scenario in which the first network management device is the device having at least the functions of the NSMF unit and the DM unit, when the deployment information of the target network slice is in the foregoing second implementation, the first network management device may determine the deployment information of the corresponding target network component based on the determined performance requirement information of each target network component, to manage each target network component, and finally manage the target network slice.

Fourth manner: When the first network management device is the NSMF unit, and the deployment information of the target network slice is in the foregoing second implementation, the first network management device may send the deployment information of the target network component to the second network management device, so that the second network management device may manage the target network component based on the deployment information of the target network component.

When the second network management device may manage all network components in the target network slice, for example, the DM unit shown in FIG. 1, the first network management device may send deployment information of all the target network components to the second network management device. The second network management device may manage each target network component based on the received deployment information of each target network component.

When the second network management devices are a plurality of devices that may respectively manage different target network components, for example, the DM units (the AN DM unit, the TN DM unit, and the CN DM unit) that are in all the domains and that are shown in FIG. 2, the first network management device may respectively send deployment information of the target network components to corresponding second network management devices. Each second network management device may manage the corresponding target network component based on received deployment information of the target network component. For example, when the target network slice includes the AN network component, the TN network component, and the CN network component, the first network management device sends the deployment information of the AN network component to the AN DM unit, so that the AN DM unit manages the AN network component; the first network management device sends the deployment information of the TN network component to the TN DM unit, so that the TN DM unit manages the TN network component; and the first network management device sends the deployment information of the CN network component to the CN DM unit, so that the CN DM unit manages the CN network component.

Fifth manner: When the first network management device is the NSMF unit, and the deployment information of the target network slice is in the foregoing third implementation, the first network management device may send the performance requirement information of the target network component to the second network management device, so that the second network management device may determine the deployment information of the target network component based on the performance requirement information of the target network component, to manage the target network component.

The following process is similar to the process in which the first network management device sends the deployment information of the target network component in the foregoing fourth manner.

When the second network management device may manage all the network components in the target network slice, the first network management device sends the performance requirement information of all the target network components to the second network management device. The second network management device may determine the deployment information of all the target network components based on the performance requirement information of all the target network components, to manage all the target network components.

When the second network management devices are a plurality of devices that may respectively manage different target network components, the first network management device may respectively send performance requirement information of the target network components to the corresponding second network management devices. Each second network management device may determine deployment information of the target network component based on the received performance requirement information of the target network component, to manage the target network component.

Sixth manner: When the first network management device is the NSMF unit, and the deployment information of the target network slice is in the foregoing fourth implementation, the first network management device may send the deployment information identity of the target network component or the performance requirement information identity of the target network component to the second network management device, so that the second network management device may determine the deployment information of the target network component based on the deployment information identity of the target network component or the performance requirement information identity of the target network component, to manage the target network component.

The second network management device may determine, based on the performance requirement information identity of the target network component, the deployment information of the target network component through the following step:

determining, by the second network management device based on the correspondence between the performance requirement information identity of the network component and the deployment information of the network component, the deployment information that is of the target network component and that corresponds to the performance requirement information identity of the target network component; or first determining, by the second network management device, the performance requirement information of the target network component, and then determining, based on the correspondence between the performance requirement information of the network component and the deployment information of the network component, the deployment information that is of the target network component and that corresponds to the performance requirement information of the target network component.

Optionally, when the target network slice includes at least one target network component, the network slice template may further include indication information of at least one network component template. A network component template indicated by the indication information of each network component template is used to deploy a corresponding target network component. In this way, in the foregoing second manner or third manner, the first network management device may first determine the network component template based on the indication information of the network component template, and then determine the deployment information of the target network component from the network component template. In the foregoing fourth manner or fifth manner, the first network management device may send the indication information of the network component template, and the deployment information of the target network component or the performance requirement information of the target network component to the second network management device, so that the second network management device may first determine the network component template, and then determine the deployment information of the network component based on the network component template.

Optionally, in the foregoing manners, the first network management device may send the deployment information of the target network component or the performance requirement information of the target network component to the second network management device by using the following method.

The first network management device sends a network component deployment request to the second network management device. The network component deployment request includes the deployment information of the target network component or the performance requirement information of the target network component.

Figure 4:
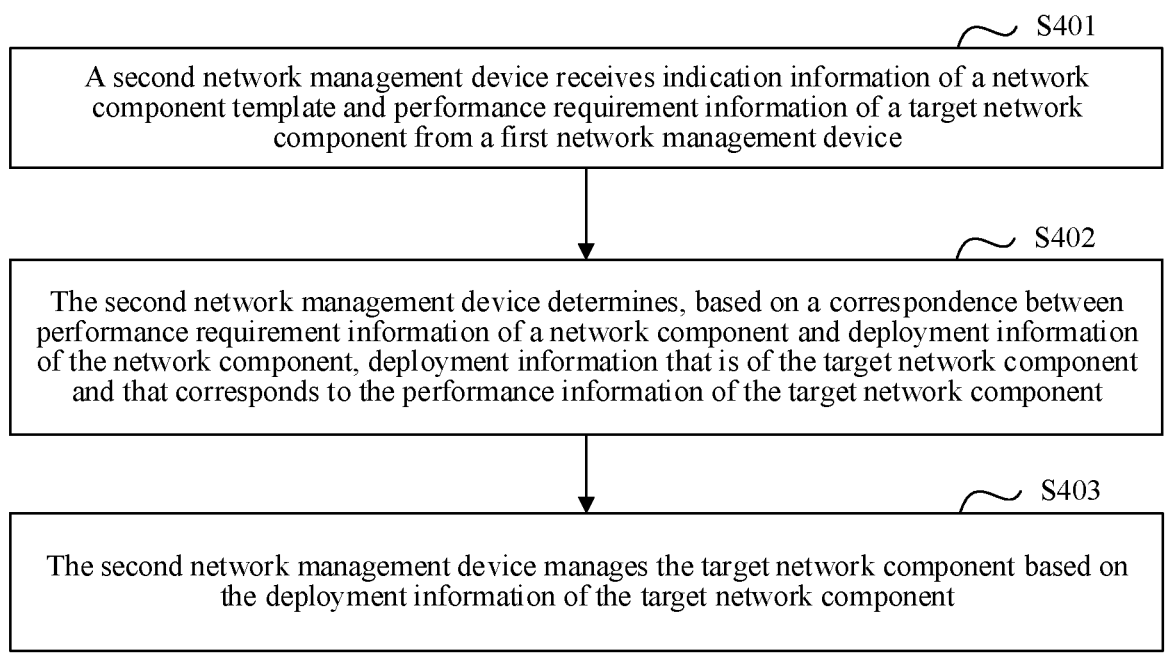
FIG. 4 is a flowchart of another network slice management method according to an embodiment of this application.

In a possible design, when the first network management device performs S303 in the foregoing fifth manner, as shown in FIG. 4, the second network management device may manage the target network component by performing the following steps.

S401: The second network management device receives the indication information of the network component template and the performance requirement information of the target network component from the first network management device.

The indication information of the network component template is used to instruct the second network management device to obtain the network component template. Therefore, after obtaining the indication information of the network component template in S401, the second network management device may determine the network component template. The network component template includes the correspondence between the performance requirement information of the network component and the deployment information of the network component.

Optionally, the indication information of the network component template may be an identity of the network component template, or an address or storage location information of the network component template.

S402: The second network management device determines, based on the correspondence between the performance requirement information of the network component and the deployment information of the network component, the deployment information that is of the target network component and that corresponds to the performance information of the target network component.

Optionally, the correspondence between the performance requirement information of the network component and the deployment information of the network component may be in a plurality of representation forms, so that the representation form of the correspondence is more flexible. The following representation forms are used as examples.

First representation form: The performance requirement information of the network component (or the performance requirement information identity of the network component) and the deployment information of the network component (or the deployment information identity of the network component) are included in a same piece of information.

Second representation form: The information element of the performance requirement information of the network component further includes the deployment information of the network component (or the deployment information identity of the network component).

Third representation form: The information element of the deployment information of the network component further includes the performance requirement information of the network component (or the performance requirement information identity of the network component).

Fourth representation form: The correspondence is the deployment script or the indication information of the deployment script, where the deployment script is used to determine the corresponding deployment information of the network component based on the performance requirement information of the network component. The indication information of the deployment script is used to obtain the deployment script, and may be an address or storage location information of the deployment script, for example, the URL address of the deployment script.

The network component template includes the foregoing information. In this way, after obtaining the performance requirement information of the to-be-deployed/managed target network component, the second network management device can directly determine, based on the foregoing information in the network component template, the deployment information that is of the target network component and that corresponds to the performance requirement information of the target network component, to deploy the target network component. The second network management device may quickly determine, by using the network component template, the deployment information of the network component based on the performance requirement information of the network component, so that the flexibility and efficiency of managing the network component are improved.

For example, the correspondence between the performance requirement information of the network component and the deployment information of the network component may be shown in Table 6.

TABLE 6

| Performance requirement information of the CN network component | Deployment information of the CN network component |
| --- | --- |
| Latency: 10 ms | One AMF entity + two SMF entities + two UPF instances |
| Latency: 10 ms; mobility: mobile; and user quantity: 1 million | Three AMF entities + six SMF entities + six UPF instances |

S403: The second network management device manages the target network component based on the deployment information of the target network component.

Through the foregoing steps, without manual involvement, the second network management device can directly obtain the deployment information of the target network component by using the indication information of the network component template and the performance requirement information of the target network component, to manage the target network component. Therefore, the network component deployment efficiency is improved.

Through the method provided in this embodiment of this application, after obtaining the indication information of the network slice template and the performance requirement information of the target network slice, the first network management device may determine the deployment information of the target network slice based on the two pieces of information, and may manage the target network slice based on the deployment information of the target network slice. In the foregoing solution, without manual involvement, the first network management device can directly obtain the deployment information of the target network slice by using the indication information of the network slice template and the performance requirement information of the target network slice, to deploy the target network slice. Therefore, the network slice deployment efficiency can be improved by using the solution.

Figure 5:
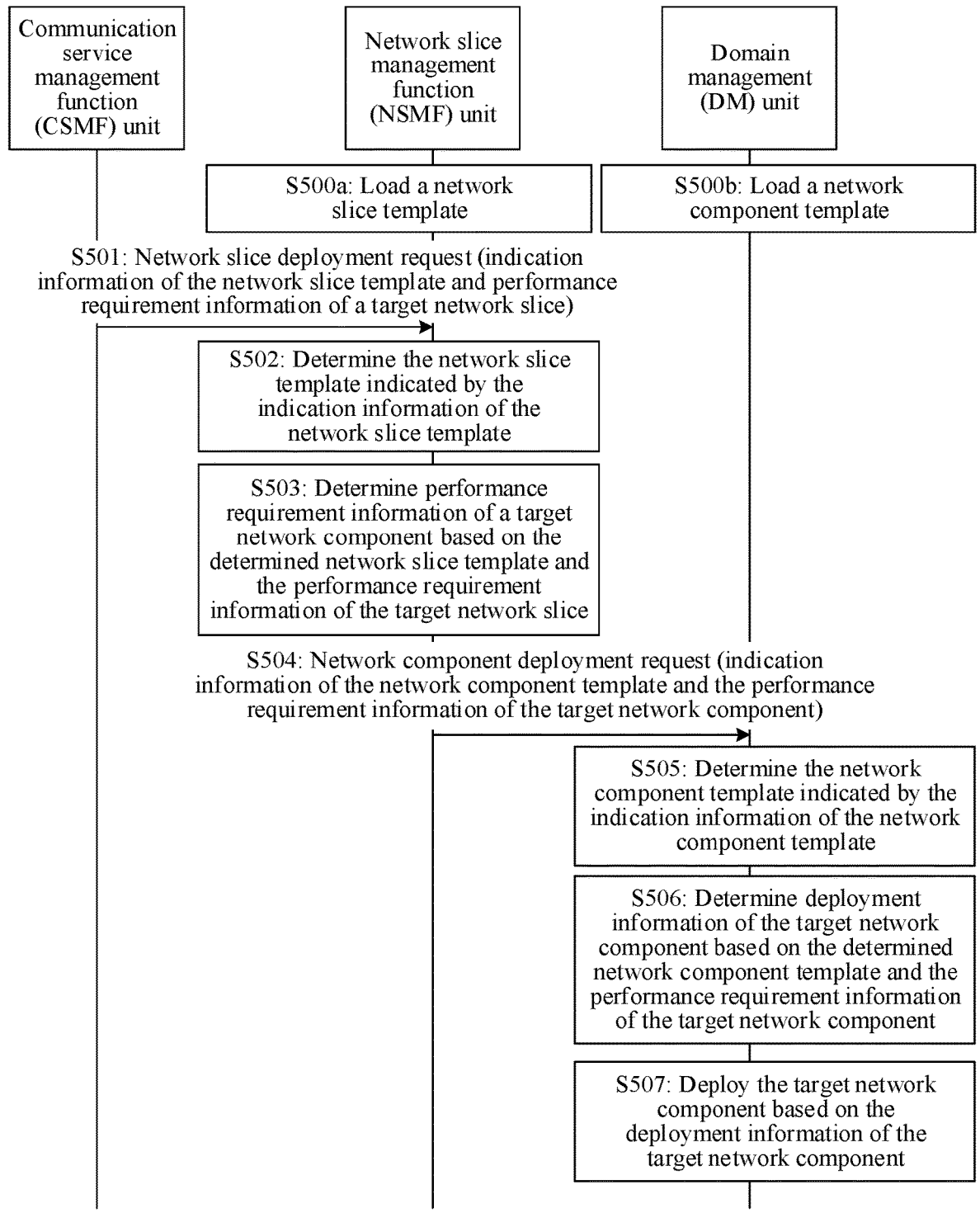
FIG. 5 is a flowchart of a first example of a network slice management method according to an embodiment of this application.

Based on the foregoing embodiments, this application further provides an example of a network slice management method, applicable to the network slice management system shown in FIG. 1 or FIG. 2. As shown in FIG. 5, before a network slice management procedure is performed in the system, S500a and S500b are further included, to load at least one network slice template to the NSMF unit, and load at least one network component template to the DM unit.

Each network slice template includes indication information of a network component template and a correspondence between performance requirement information of a network slice and performance requirement information of a network component.

The network component template includes a correspondence between the performance requirement information of the network component and deployment information of the network component.

As shown in FIG. 5, the method includes the following procedure.

S501: The CSMF unit in the system sends a network slice deployment request to the NSMF unit, where the network slice deployment request includes indication information of a network slice template and performance requirement information of a target network slice.

The network slice template indicated by the indication information of the network slice template is used to deploy the target network slice.

S502: After receiving the network slice deployment request, the NSMF unit obtains the indication information of the network slice template and the performance requirement information of the target network slice that are included in the network slice deployment request, and determines the network slice template indicated by the indication information of the network slice template, to obtain indication information of a network component template and a correspondence between performance requirement information of a network slice and performance requirement information of a network component that are included in the network slice template.

S503: The NSMF unit determines, based on the determined network slice template and the performance requirement information of the target network slice, performance requirement information of a target network component that is included in the target network slice.

Specifically, the NSMF unit determines, based on the correspondence that is between the performance requirement information of the network slice and the performance requirement information of the network component and that is included in the determined network slice template, the performance requirement information that is of the target network component and that corresponds to the performance requirement information of the target network slice.

Optionally, when the correspondence between the performance requirement information of the network slice and the performance requirement information of the network component is a first deployment script, the NSMF unit may calculate, by using the first deployment script, the performance requirement information that is of the target network component and that corresponds to the performance requirement information of the target network slice.

S504: The NSMF unit sends a network component deployment request to the DM unit, where the network component deployment request includes the obtained indication information of the network component template and the performance requirement information of the target network component.

S505: After receiving the network component deployment request, the DM unit obtains the indication information of the network component template and the performance requirement information of the target network component that are included in the network component deployment request, and determines the network component template indicated by the indication information of the network component template, to obtain the correspondence that is between the performance requirement information of the network component and the deployment information of the network component and that is included in the network component template.

S506: The DM unit determines the deployment information of the target network component based on the determined network component template and the performance requirement information of the target network component.

Specifically, the DM unit determines, based on the correspondence that is between the performance requirement information of the network component and the deployment information of the network component and that is included in the determined network component template, the deployment information that is of the target network component and that corresponds to the performance requirement information of the target network component.

Optionally, when the correspondence between the performance requirement information of the network component and the deployment information of the network component is a second deployment script, the DM unit may calculate, by using the second deployment script, the deployment information that is of the target network component and that corresponds to the performance requirement information of the target network component.

S507: The DM unit deploys the target network component based on the deployment information of the target network component.

The DM unit can finally deploy the target network slice by deploying the target network component included in the target network slice.

Figure 6:
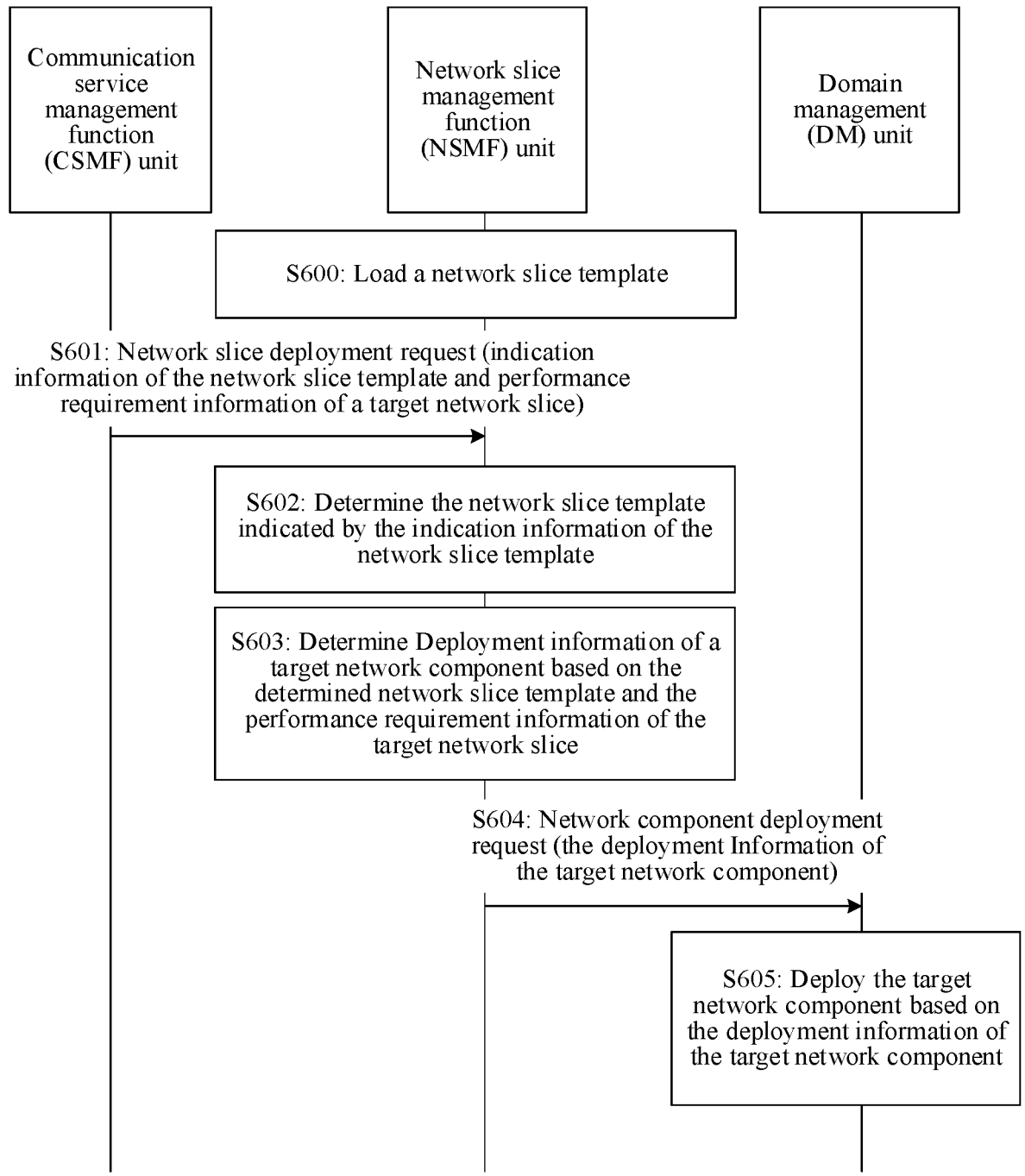
FIG. 6 is a flowchart of a second example of a network slice management method according to an embodiment of this application.

Based on the foregoing embodiments, this application further provides another example of a network slice management method, applicable to the network slice management system shown in FIG. 1 or FIG. 2. As shown in FIG. 6, before a network slice management procedure is performed in the system, S600 is further included, to load at least one network slice template to the NSMF unit.

Each network slice template includes a correspondence between performance requirement information of a network slice and deployment information of a network component.

As shown in FIG. 6, the method includes the following procedure.

S601: The CSMF unit in the system sends a network slice deployment request to the NSMF unit, where the network slice deployment request includes indication information of a network slice template and performance requirement information of a target network slice.

The network slice template indicated by the indication information of the network slice template is used to deploy the target network slice.

S602: After receiving the network slice deployment request, the NSMF unit obtains the indication information of the network slice template and the performance requirement information of the target network slice that are included in the network slice deployment request, and determines the network slice template indicated by the indication information of the network slice template, to obtain a correspondence that is between performance requirement information of a network slice and deployment information of a network component and that is included in the network slice template.

S603: The NSMF unit determines, based on the determined network slice template and the performance requirement information of the target network slice, deployment information of a target network component that is included in the target network slice.

Specifically, the NSMF unit determines, based on the correspondence that is between the performance requirement information of the network slice and the deployment information of the network component and that is included in the determined network slice template, the deployment information that is of the target network component and that corresponds to the performance requirement information of the target network slice.

Optionally, when the correspondence between the performance requirement information of the network slice and the deployment information of the network component is a deployment script, the NSMF unit may calculate, based on the deployment script, the deployment information that is of the target network component and that corresponds to the performance requirement information of the target network slice.

S604: The NSMF unit sends a network component deployment request to the DM unit, where the network component deployment request includes the deployment information of the target network component.

S605: After receiving the network component deployment request, the DM unit deploys the target network component based on the deployment information of the target network component.

The DM unit can finally deploy the target network slice by deploying the target network component included in the target network slice.

Figure 7:
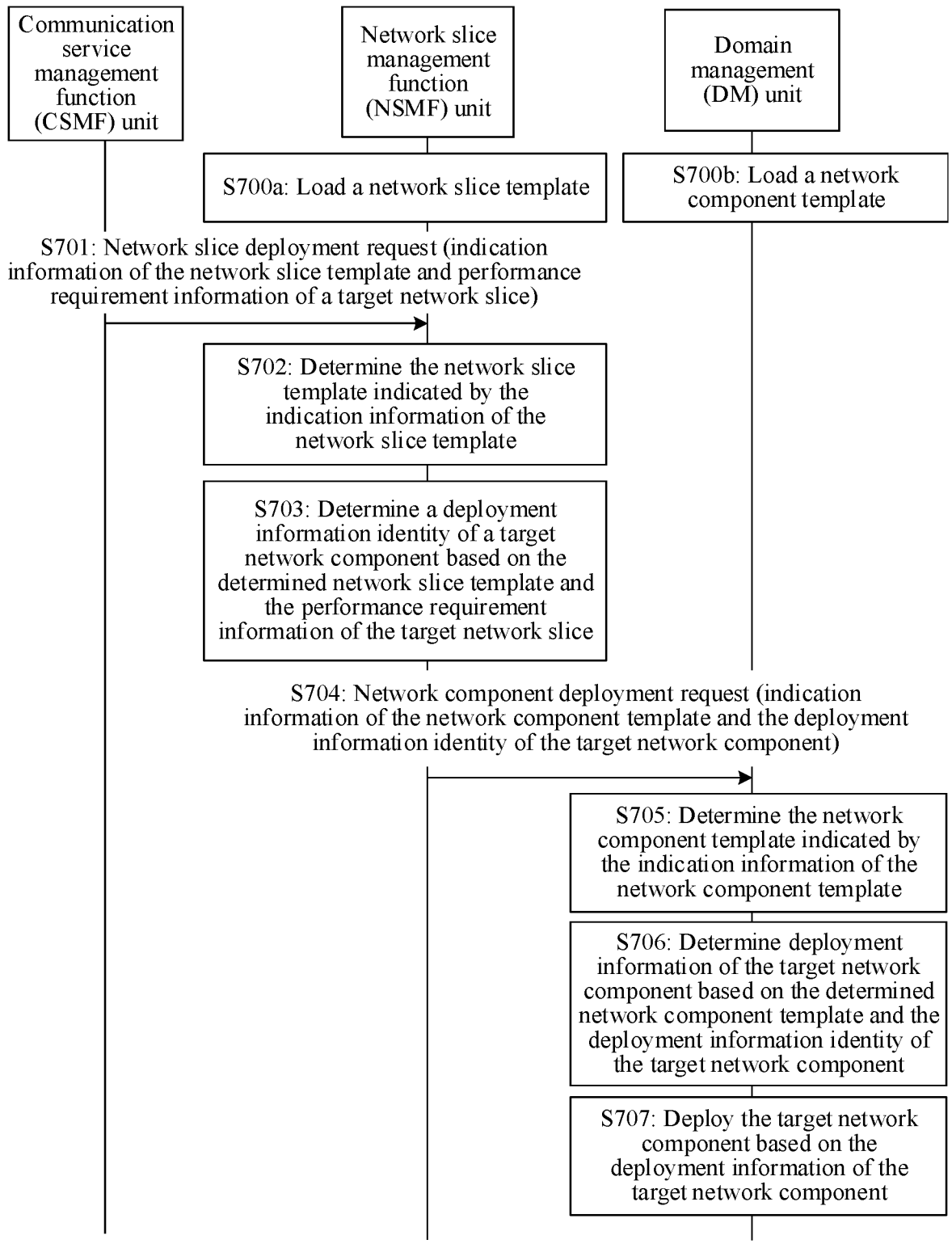
FIG. 7 is a flowchart of a third example of a network slice management method according to an embodiment of this application.

Based on the foregoing embodiments, this application further provides still another example of a network slice management method, applicable to the network slice management system shown in FIG. 1 or FIG. 2. As shown in FIG. 7, before a network slice management procedure is performed in the system, S700a and S700b are further included, to load at least one network slice template to the NSMF unit, and load at least one network component template to the DM unit.

Each network slice template includes indication information of a network component template and a correspondence between performance requirement information of a network slice and a deployment information identity of a network component.

The network component template includes deployment information of a plurality of network components.

As shown in FIG. 7, the method includes the following procedure.

S701: The CSMF unit in the system sends a network slice deployment request to the NSMF unit, where the network slice deployment request includes indication information of a network slice template and performance requirement information of a target network slice.

The network slice template indicated by the indication information of the network slice template is used to deploy the target network slice.

S702: After receiving the network slice deployment request, the NSMF unit obtains the indication information of the network slice template and the performance requirement information of the target network slice that are included in the network slice deployment request, and determines the network slice template indicated by the indication information of the network slice template, to obtain the indication information of the network component template and a correspondence between the performance requirement information of the network slice and a deployment information identity of the network component that are included in the network slice template.

S703: The NSMF unit determines, based on the determined network slice template and the performance requirement information of the target network slice, a deployment information identity of a target network component that is included in the target network slice.

Specifically, the NSMF unit determines, based on the correspondence that is between the performance requirement information of the network slice and the deployment information identity of the network component and that is included in the determined network slice template, the deployment information identity that is of the target network component and that corresponds to the performance requirement information of the target network slice.

S704: The NSMF unit sends a network component deployment request to the DM unit, where the network component deployment request includes the obtained indication information of the network component template and the deployment information identity of the target network component.

S705: After receiving the network component deployment request, the DM unit obtains the indication information of the network component template and the deployment information identity of the target network component that are included in the network component deployment request, and determines the network component template indicated by the indication information of the network component template.

S706: The DM unit determines deployment information of the target network component based on the determined network component template and the deployment information identity of the target network component.

Specifically, from deployment information that is of a plurality of network components and that is included in the network component template, the DM unit determines the deployment information that is of the target network component and that is indicated by the deployment information identity of the target network component.

S707: The DM unit deploys the target network component based on the deployment information of the target network component.

The DM unit can finally deploy the target network slice by deploying the target network component included in the target network slice.

It should be noted that, in the system, a procedure of the network slice management method that is performed when deployment information of the target network slice is a performance requirement information identity of the target network component is basically the same as the procedure shown in FIG. 7, that is, the deployment information identity of the target network component in the embodiment shown in FIG. 7 is replaced with the performance requirement information identity of the target network component, and the difference is that the DM unit performs the step of determining the deployment information of the target network component.

When the network component template includes a correspondence between a performance requirement information identity of the network component and the deployment information of the network component, the DM unit determines the deployment information of the target network component by using the following step:

determining, by the DM unit based on the correspondence that is between the performance requirement information identity of the network component and the deployment information of the network component and that is included in the determined network slice template, the deployment information that is of the target network component and that corresponds to the performance requirement information identity of the target network component.

When the network component template includes performance requirement information of the plurality of network components and a correspondence between the performance requirement information of the network component and the deployment information of the network component, the DM unit determines the deployment information of the target network component by using the following steps:

from the performance requirement information of the plurality of network components, determining, by the DM unit, the performance requirement information that is of the target network component and that is indicated by the performance requirement information identity of the target network component; and determining, by the DM unit based on the correspondence between the performance requirement information of the network component and the deployment information of the network component, the deployment information that is of the target network component and that corresponds to the performance requirement information of the target network component.

Figure 8:
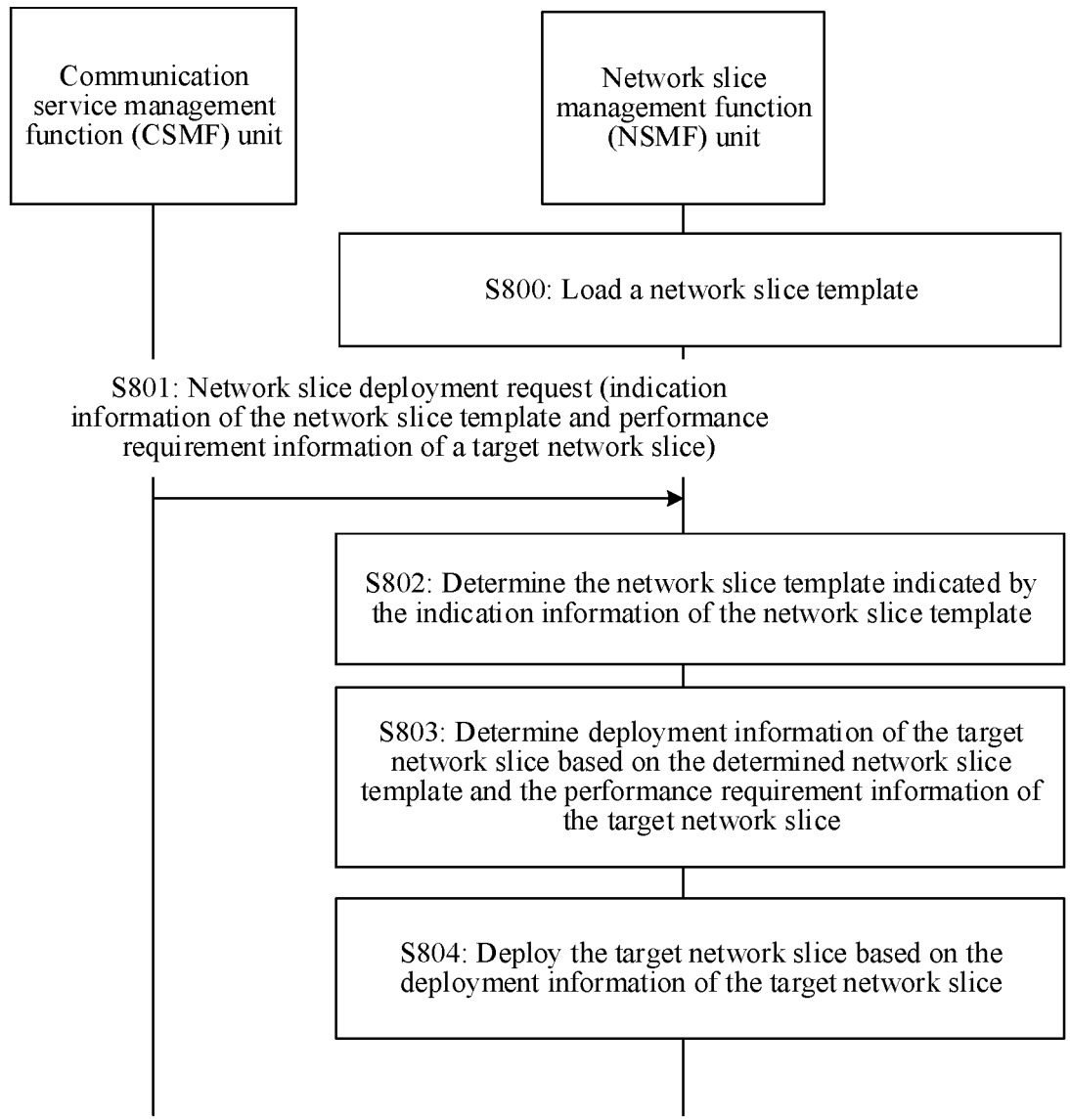
FIG. 8 is a flowchart of a fourth example of a network slice management method according to an embodiment of this application.

Based on the foregoing embodiments, this application further provides still another example of a network slice management method, applicable to the network slice management system shown in FIG. 1 or FIG. 2. As shown in FIG. 8, before a network slice management procedure is performed in the system, S800 is further included, to load at least one network slice template to the NSMF unit.

Each network slice template includes a correspondence between performance requirement information of a network slice and deployment information of the network slice. The deployment information of the network slice includes at least one of the following pieces of information: a deployment flavor of the target network slice and a deployment flavor of a network service corresponding to the target network slice.

As shown in FIG. 8, the method includes the following procedure.

S801: The CSMF unit in the system sends a network slice deployment request to the NSMF unit, where the network slice deployment request includes indication information of a network slice template and performance requirement information of a target network slice.

The network slice template indicated by the indication information of the network slice template is used to deploy the target network slice.

S802: After receiving the network slice deployment request, the NSMF unit obtains the indication information of the network slice template and the performance requirement information of the target network slice that are included in the network slice deployment request, and determines the network slice template indicated by the indication information of the network slice template, to obtain a correspondence that is between performance requirement information of a network slice and deployment information of the network slice and that is included in the network slice template.

S803: The NSMF unit determines deployment information of the target network slice based on the determined network slice template and the performance requirement information of the target network slice.

Specifically, the NSMF unit determines, based on the correspondence that is between the performance requirement information of the network slice and the deployment information of the network slice and that is included in the determined network slice template, the deployment information that is of the target network slice and that corresponds to the performance requirement information of the target network slice.

Optionally, when the correspondence between the performance requirement information of the network slice and the deployment information of the network slice is a deployment script, the NSMF unit may calculate, based on the deployment script, the deployment information that is of the target network slice and that corresponds to the performance requirement information of the target network slice.

S804: The NSMF deploys the target network slice based on the deployment information of the target network slice.

Optionally, the NSMF may collaboratively deploy the target network slice with the DM unit in the system.

Figure 9:
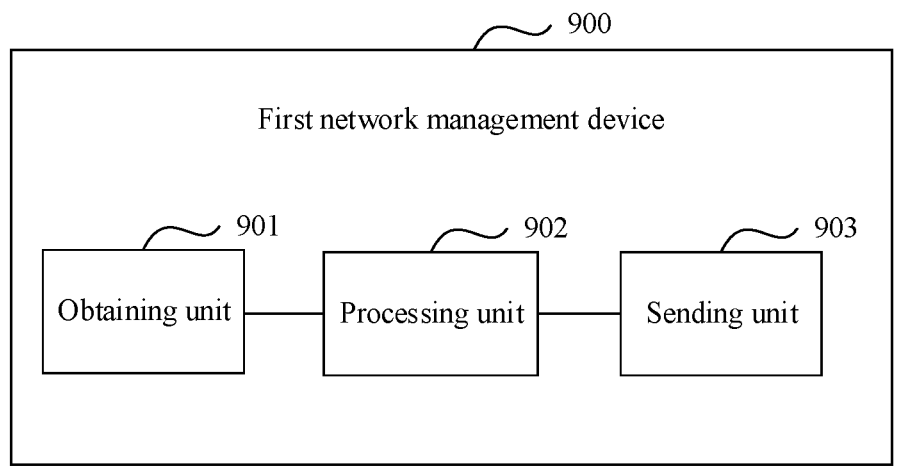
FIG. 9 is a structural diagram of a first type of a first network management device according to an embodiment of this application.

Based on the foregoing embodiments, an embodiment of this application further provides a first network management device, configured to implement the network slice management method shown in FIG. 3. The first network management device may be applied to the network slice management system shown in FIG. 1 or FIG. 2. As shown in FIG. 9, the first network management device 900 includes: an obtaining unit 901 and a processing unit 902.

The obtaining unit 901 is configured to obtain indication information of a network slice template and performance requirement information of a target network slice, where the indication information of the network slice template is used to instruct the first network management device to obtain the network slice template, and the network slice template includes a correspondence between performance requirement information of a network slice and deployment information of the network slice.

The processing unit 902 is configured to determine, based on the correspondence between the performance requirement information of the network slice and the deployment information of the network slice, deployment information that is of the target network slice and that corresponds to the performance requirement information of the target network slice.

Optionally, the performance requirement information of the target network slice includes at least one of the following parameters of the target network slice: a latency, a bandwidth, a coverage level, a coverage area, mobility, a user quantity, user distribution, a capacity, a throughput, reliability information, a transmission model, location information, and a success ratio.

Optionally, the deployment information of the target network slice includes at least one of the following pieces of information: a deployment flavor of the target network slice and a deployment flavor of a network service corresponding to the target network slice.

Optionally, the target network slice includes a target network component; and the deployment information of the target network slice includes deployment information of the target network component.

Optionally, the deployment information of the target network component includes at least one of the following pieces of information: a deployment flavor of the target network component, a quantity of instances of the target network component, an instantiation level of the target network component, and deployment location constraint information of the target network component.

Optionally, the deployment information of the target network component includes at least one of the following pieces of information: a deployment flavor of a network service corresponding to the target network component, a quantity of instances of the network service corresponding to the target network component, an instantiation level of the network service corresponding to the target network component, and deployment location constraint information of the network service corresponding to the target network component.

Optionally, the target network slice includes the target network component; and the deployment information of the target network slice includes performance requirement information of the target network component.

Optionally, the performance requirement information of the target network component includes at least one of the following parameters of the target network component: a latency, a bandwidth, a coverage level, a coverage area, mobility, a user quantity, user distribution, a capacity, a throughput, reliability information, a transmission model, location information, and a success ratio.

Optionally, the target network slice includes the target network component; and the deployment information of the target network slice includes a deployment information identity of the target network component or a performance requirement information identity of the target network component.

Optionally, the network slice template further includes indication information of a network component template, and the indication information of the network component template is used to instruct a second network management device to obtain the network component template; and the processing unit is specifically configured to:

control a sending unit 903 to send the deployment information of the target network slice and the indication information of the network component template to the second network management device, so that the second network management device manages the target network component.

The sending unit 903 is configured to send the deployment information of the target network slice and the indication information of the network component template to the second network management device.

Optionally, the correspondence between the performance requirement information of the network slice and the deployment information of the network slice is a deployment script, and the deployment script is used to determine the corresponding deployment information of the network slice based on the performance requirement information of the network slice.

This embodiment of this application provides the first network management device. After obtaining the indication information of the network slice template and the performance requirement information of the target network slice, the first network management device may determine the deployment information of the target network slice based on the two pieces of information, and may manage the target network slice based on the deployment information of the target network slice. In the foregoing solution, without manual involvement, the first network management device can directly obtain the deployment information of the target network slice by using the indication information of the network slice template and the performance requirement information of the target network slice, to deploy the target network slice. Therefore, the network slice deployment efficiency can be improved by using the solution.

Figure 10:
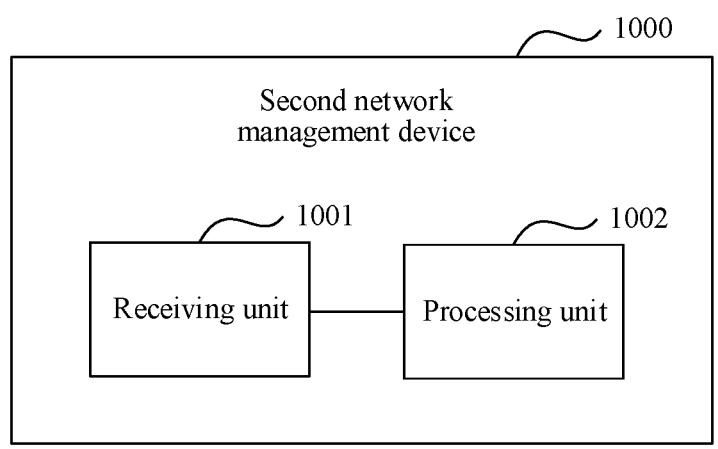
FIG. 10 is a structural diagram of a first type of a second network management device according to an embodiment of this application.

Based on the foregoing embodiments, an embodiment of this application further provides a second network management device, configured to implement the network slice management method shown in FIG. 4. The second network management device may be applied to the network slice management system shown in FIG. 1 or FIG. 2. As shown in FIG. 10, the second network management device 1000 includes: a receiving unit 1001 and a processing unit 1002.

The receiving unit 1001 is configured to receive indication information of a network component template and performance requirement information of a target network component from a first network management device, where the indication information of the network component template is used to instruct the second network management device to obtain the network component template, and the network component template includes a correspondence between performance requirement information of a network component and deployment information of the network component.

The processing unit 1002 is configured to determine, based on the correspondence between the performance requirement information of the network component and the deployment information of the network component, deployment information that is of the target network component and that corresponds to the performance information of the target network component.

Optionally, the performance requirement information of the target network component includes at least one of the following parameters of the target network component: a latency, a bandwidth, a coverage level, a coverage area, mobility, a user quantity, user distribution, a capacity, a throughput, reliability information, a transmission model, location information, and a success ratio.

Optionally, the deployment information of the target network component includes at least one of the following pieces of information: a deployment flavor of the target network component, a quantity of instances of the target network component, an instantiation level of the target network component, and deployment location constraint information of the target network component.

Optionally, the deployment information of the target network component includes at least one of the following pieces of information: a deployment flavor of a network service corresponding to the target network component, a quantity of instances of the network service corresponding to the target network component, an instantiation level of the network service corresponding to the target network component, and deployment location constraint information of the network service corresponding to the target network component.

This embodiment of this application provides the second network management device. Without manual involvement, the second network management device can directly obtain the deployment information of the target network component by using the indication information of the network component template and the performance requirement information of the target network component, to manage the target network component. Therefore, the network component deployment efficiency is improved.

It should be noted that division of the modules in the embodiments of this application is an example, and is merely logical function division. There may be other division manners during actual implementation. In addition, the functional units in the embodiments of this application may be integrated into one processing unit, or each of the processing units may exist alone physically, or two or more units may be integrated into one unit. The foregoing integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be represented in the form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that may store program code, such as a USB flash drive, a removable hard disk, a read-only memory (ROM), a random access memory (RAM), a magnetic disk, or a compact disc.

Figure 11:
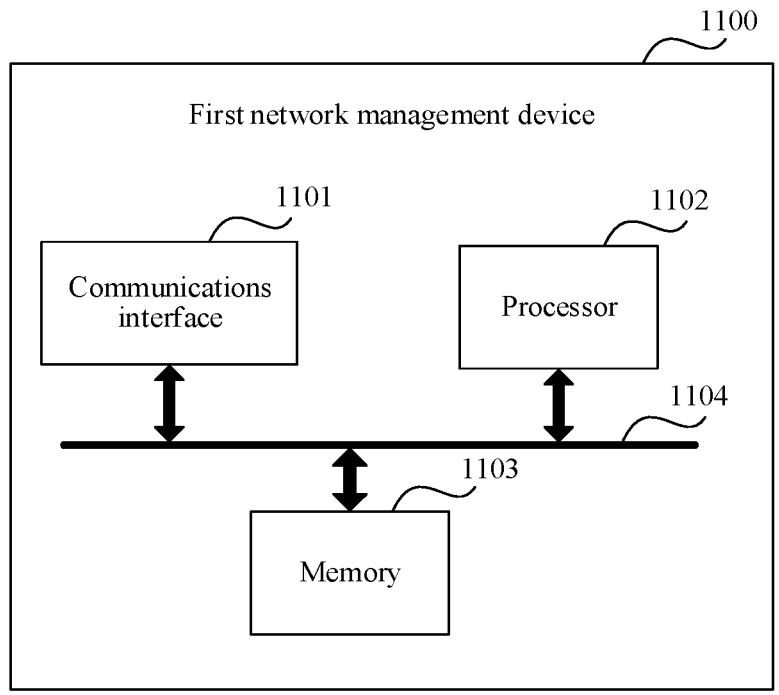
FIG. 11 is a structural diagram of a second type of a first network management device according to an embodiment of this application.

Based on the foregoing embodiments, an embodiment of this application further provides a first network management device. The first network management device is configured to implement the network slice management method shown in FIG. 3, and has functions of the first network management device 900 shown in FIG. 9. As shown in FIG. 11, the first network management device 1100 includes: a communications interface 1101, a processor 1102, and a memory 1103. The communications interface 1101, the processor 1102, and the memory 1103 are connected to each other.

The communications interface 1101, the processor 1102, and the memory 1103 are connected to each other by using a bus 1104. The bus 1104 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 11, but this does not mean that there is only one bus or only one type of bus.

The communications interface 1101 is configured to receive and send data, and implement communication and interaction with another device (for example, the second network management device) in the network slice management system.

The processor 1102 is configured to implement the network slice management method shown in FIG. 3. For details, refer to descriptions in the foregoing embodiments, and details are not described herein again.

The memory 1103 is configured to store a program instruction and the like. Specifically, the program instruction may include program code. The program code includes a computer operation instruction. The memory 1103 may include a random access memory (RAM), or may further include a non-volatile memory, such as at least one disk memory. The processor 1102 executes the program instruction stored in the memory 1103 to implement the foregoing function, to implement the network slice management methods provided in the foregoing embodiments.

Figure 12:
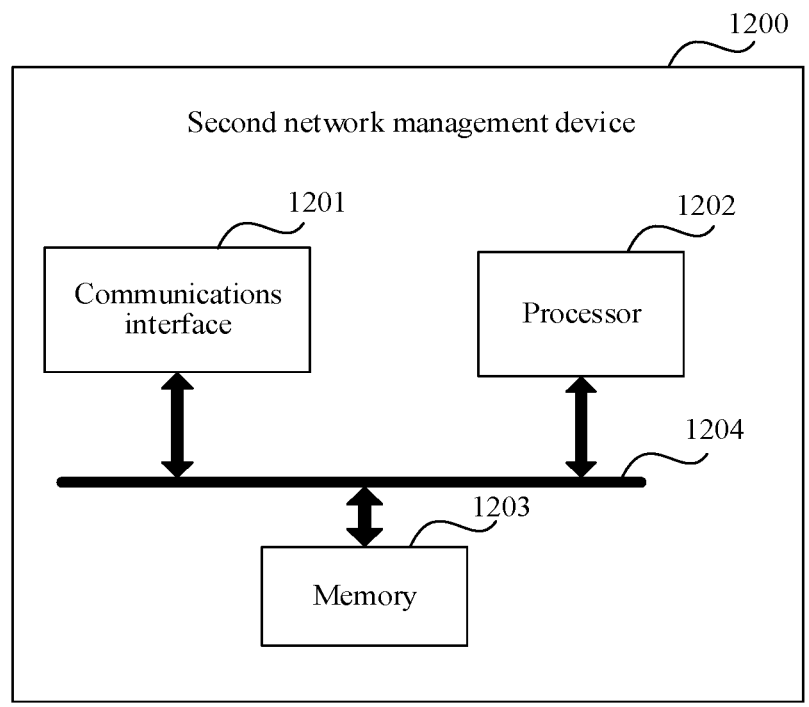
FIG. 12 is a structural diagram of a second type of a second network management device according to an embodiment of this application.

Based on the foregoing embodiments, an embodiment of this application further provides a second network management device. The second network management device is configured to implement the network slice management method shown in FIG. 4, and has functions of the second network management device 1000 shown in FIG. 10. As shown in FIG. 12, the second network management device 1200 includes: a communications interface 1201, a processor 1202, and a memory 1203. The communications interface 1201, the processor 1202, and the memory 1203 are connected to each other.

The communications interface 1201, the processor 1202, and the memory 1203 are connected to each other by using a bus 1204. The bus 1204 may be a PCI bus, an EISA bus, or the like. The bus may be classified into an address bus, a data bus, a control bus, and the like. For ease of representation, only one thick line is used to represent the bus in FIG. 12, but this does not mean that there is only one bus or only one type of bus.

The communications interface 1201 is configured to receive and send data, and implement communication and interaction with another device (for example, the first network management device) in the network slice management system.

The processor 1202 is configured to implement the network slice management method shown in FIG. 4. For details, refer to descriptions in the foregoing embodiments, and details are not described herein again.

The memory 1203 is configured to store a program instruction and the like. Specifically, the program instruction may include program code. The program code includes a computer operation instruction. The memory 1203 may include a random access memory (RAM), or may further include a non-volatile memory, such as at least one disk memory. The processor 1202 executes the program instruction stored in the memory 1203 to implement the foregoing function, to implement the network slice management methods provided in the foregoing embodiments.

In conclusion, the embodiments of this application provide the network slice management method and the device. In the solution, after obtaining the indication information of the network slice template and the performance requirement information of the target network slice, the first network management device may determine the deployment information of the target network slice based on the two pieces of information, and may manage the target network slice based on the deployment information of the target network slice. In the foregoing solution, without manual involvement, the first network management device can directly obtain the deployment information of the target network slice by using the indication information of the network slice template and the performance requirement information of the target network slice, to deploy the target network slice. Therefore, the network slice deployment efficiency can be improved by using the solution.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer usable storage media (including but not limited to a disk memory, a CD-ROM, an optical memory, and the like) that include computer usable program code.

This application is described with reference to flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Definitely, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A network slice management method, comprising:
obtaining, by a first network management device, indication information of a network slice template and performance requirement information of a target network slice, wherein the indication information of the network slice template comprises an identity of the network slice template and is used to instruct the first network management device to obtain the network slice template, and the network slice template comprises a correspondence between performance requirement information of network slices and deployment information of the network slices; and
determining, by the first network management device based on the correspondence between the performance requirement information of the network slice and the deployment information of the network slice, deployment information that is of the target network slice and that corresponds to the performance requirement information of the target network slice;
wherein the target network slice comprises a target network component, and the deployment information of the target network slice comprises performance requirement information of the target network component;
wherein the network slice template further comprises indication information of a network component template, and the indication information of the network component template instructs a second network management device to obtain the network component template; and
wherein the first network management device manages the target network slice based on the deployment information of the target network slice by sending the deployment information of the target network slice and the indication information of the network component template to the second network management device, so that the second network management device manages the target network component.

2. The method according to claim 1, wherein the performance requirement information of the target network slice comprises at least one of the following parameters of the target network slice: a latency, a bandwidth, a coverage level, a coverage area, mobility, a user quantity, user distribution, a capacity, a throughput, reliability information, a transmission model, location information, or a success ratio.

3. The method according to claim 1, wherein the deployment information of the target network slice comprises at least one of the following pieces of information: a deployment flavor of the target network slice and a deployment flavor of a network service corresponding to the target network slice.

4. The method according to claim 1, wherein
the target network slice comprises a target network component; and
the deployment information of the target network slice comprises deployment information of the target network component.

5. The method according to claim 4, wherein
the deployment information of the target network component comprises at least one of the following pieces of information: a deployment flavor of the target network component, a quantity of instances of the target network component, an instantiation level of the target network component, and deployment location constraint information of the target network component; or
the deployment information of the target network component comprises at least one of the following pieces of information: a deployment flavor of a network service corresponding to the target network component, a quantity of instances of the network service corresponding to the target network component, an instantiation level of the network service corresponding to the target network component, and deployment location constraint information of the network service corresponding to the target network component.

6. The method according to claim 1, wherein the performance requirement information of the target network component comprises at least one of the following pieces of information of the target network component: a latency, a bandwidth, a coverage level, a coverage area, mobility, a user quantity, user distribution, a capacity, a throughput, reliability information, a transmission model, location information, and a success ratio.

7. The method according to claim 1, wherein
the target network slice comprises a target network component; and
the deployment information of the target network slice comprises a deployment information identity of the target network component or a performance requirement information identity of the target network component.

8. The method according to claim 1, wherein the correspondence between the performance requirement information of the network slice and the deployment information of the network slice is a deployment script, and the deployment script is used to determine the corresponding deployment information of the network slice based on the performance requirement information of the network slice.

9. A first network management device, comprising:
a memory and at least one processor, wherein the memory is configured to store a program, and wherein the at least one processor is configured to invoke the program in the memory, wherein the program instructs the at least one processor to:
obtain indication information of a network slice template and performance requirement information of a target network slice, wherein the indication information of the network slice template comprises an identity of the network slice template and is used to instruct the first network management device to obtain the network slice template, and the network slice template comprises a correspondence between performance requirement information of network slices and deployment information of the network slices; and
determine, based on the correspondence between the performance requirement information of the network slice and the deployment information of the network slice, deployment information that is of the target network slice and that corresponds to the performance requirement information of the target network slice;

wherein the target network slice comprises a target network component and the deployment information of the target network slice comprises performance requirement information of the target network component;

wherein the network slice template further comprises indication information of a network component template, and the indication information of the network component template instructs a second network management device to obtain the network component template; and wherein the at least one processor is further configured to send the deployment information of the target network slice and the indication information of the network component template to the second network management device, so that the second network management device manages the target network component.

10. The first network management device according to claim 9, wherein the performance requirement information of the target network slice comprises at least one of the following parameters of the target network slice: a latency, a bandwidth, a coverage level, a coverage area, mobility, a user quantity, user distribution, a capacity, a throughput, reliability information, a transmission model, location information, or a success ratio.

11. The first network management device according to claim 9, wherein the deployment information of the target network slice comprises at least one of the following pieces of information: a deployment flavor of the target network slice and a deployment flavor of a network service corresponding to the target network slice.

12. The first network management device according to claim 9, wherein
the target network slice comprises a target network component; and
the deployment information of the target network slice comprises deployment information of the target network component.

13. The first network management device according to claim 1, wherein
the deployment information of the target network component comprises at least one of the following pieces of information: a deployment flavor of the target network component, a quantity of instances of the target network component, an instantiation level of the target network component, and deployment location constraint information of the target network component; or
the deployment information of the target network component comprises at least one of the following pieces of information: a deployment flavor of a network service corresponding to the target network component, a quantity of instances of the network service corresponding to the target network component, an instantiation level of the network service corresponding to the target network component, and deployment location constraint information of the network service corresponding to the target network component.

14. The first network management device according to claim 9, wherein the performance requirement information of the target network component comprises at least one of the following parameters of the target network component: a latency, a bandwidth, a coverage level, a coverage area, mobility, a user quantity, user distribution, a capacity, a throughput, reliability information, a transmission model, location information, and a success ratio.

15. The first network management device according to claim 9, wherein
the target network slice comprises a target network component; and
the deployment information of the target network slice comprises a deployment information identity of the target network component or a performance requirement information identity of the target network component.

16. A non-transitory computer storage medium, wherein the non-transitory computer storage medium stores a computer program, and when executed by a processor, the program is configured to: obtain indication information of a network slice template and performance requirement information of a target network slice, wherein the indication information of the network slice template comprises an identity of the network slice template and is used to instruct the first network management device to obtain the network slice template, and the network slice template comprises a correspondence between performance requirement information of network slices and deployment information of the network slices; and determine, based on the correspondence between the performance requirement information of the network slice and the deployment information of the network slice, deployment information that is of the target network slice and that corresponds to the performance requirement information of the target network slice;

wherein the target network slice comprises a target network component and the deployment information of the target network slice comprises performance requirement information of the target network component;

wherein the network slice template further comprises indication information of a network component template, and the indication information of the network component template instructs a second network management device to obtain the network component template; and wherein the processor is further configured to send the deployment information of the target network slice and the indication information of the network component template to the second network management device, so that the second network management device manages the target network component.

* * * * *

UNITED STATES PATENT AND TRADEMARK OFFICE
CERTIFICATE OF CORRECTION

PATENT NO. : 11,323,336 B2
APPLICATION NO. : 16/829061
DATED : May 3, 2022
INVENTOR(S) : Ruiyue Xu et al.

Page 1 of 1

It is certified that error appears in the above-identified patent and that said Letters Patent is hereby corrected as shown below:

In the Claims

In Column 39, Line 42, in Claim 13, delete "1," and insert -- 12, --.

Signed and Sealed this
Second Day of August, 2022

*Katherine Kelly Vidal*
Katherine Kelly Vidal
*Director of the United States Patent and Trademark Office*